US011812277B2

(12) United States Patent
Yerramalli et al.

(10) Patent No.: US 11,812,277 B2
(45) Date of Patent: Nov. 7, 2023

(54) INTERFERENCE MITIGATION THROUGH SILENCING SIGNALS IN SHARED RADIO FREQUENCY SPECTRUM

(71) Applicant: QUALCOMM Incorporated, San Diego, CA (US)

(72) Inventors: Srinivas Yerramalli, Hyderabad (IN); Arumugam Chendamarai Kannan, San Diego, CA (US); Tao Luo, San Diego, CA (US); Vinay Chande, San Diego, CA (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 87 days.

(21) Appl. No.: 17/167,024

(22) Filed: Feb. 3, 2021

(65) Prior Publication Data

US 2021/0250774 A1     Aug. 12, 2021

Related U.S. Application Data

(60) Provisional application No. 62/971,334, filed on Feb. 7, 2020.

(51) Int. Cl.
| | | |
|---|---|---|
| *H04W 16/14* | (2009.01) | |
| *H04W 74/08* | (2009.01) | |
| *H04W 76/27* | (2018.01) | |
| *H04W 80/02* | (2009.01) | |
| *H04W 56/00* | (2009.01) | |
| *H04W 72/30* | (2023.01) | |

(52) U.S. Cl.
CPC ......... *H04W 16/14* (2013.01); *H04W 56/001* (2013.01); *H04W 72/30* (2023.01); *H04W 74/0816* (2013.01); *H04W 76/27* (2018.02); *H04W 80/02* (2013.01)

(58) Field of Classification Search
CPC ... H04W 56/001; H04W 80/02; H04W 76/27; H04W 72/005; H04W 74/0816; H04W 16/14; H04W 76/00; H04W 88/08; H04W 72/04
See application file for complete search history.

(56) References Cited

U.S. PATENT DOCUMENTS

| | | | |
|---|---|---|---|
| 6,898,194 B1 * | 5/2005 | Vedrine ............ | H04W 72/1263 370/347 |
| 9,955,318 B1 * | 4/2018 | Scheper ................ | G06Q 10/02 |
| 11,206,549 B1 * | 12/2021 | Eyuboglu ............ | H04W 36/06 |

(Continued)

*Primary Examiner* — Hassan A Phillips
*Assistant Examiner* — Prenell P Jones
(74) *Attorney, Agent, or Firm* — Holland & Hart LLP

(57) ABSTRACT

Methods, systems, and devices for wireless communications are described for silencing signal transmissions by a user equipment (UE). Silencing signals may be transmitted periodically during shared spectrum downlink communications from a serving base station to the UE to prevent an interfering node from passing a listen before talk (LBT) procedure. The silencing signal transmissions may be configured by the base station and enabled in cases where potential interfering nodes are detected. An interfering node may be notified that silencing signals are being used, and may adjust a periodicity or wait time of its LBT procedures based on the silencing signal periodicity.

30 Claims, 19 Drawing Sheets

(56) References Cited

U.S. PATENT DOCUMENTS

| | | | | |
|---|---|---|---|---|
| 11,271,699 | B1* | 3/2022 | Eyuboglu | H04L 5/0023 |
| 2007/0224626 | A1* | 9/2007 | Jeddeloh | C12Q 1/6886 |
| | | | | 435/6.12 |
| 2007/0288234 | A1* | 12/2007 | Huo | G10L 19/173 |
| | | | | 704/219 |
| 2011/0194538 | A1* | 8/2011 | Zheng | H04W 76/28 |
| | | | | 370/335 |
| 2012/0320741 | A1* | 12/2012 | Freda | H04W 72/04 |
| | | | | 370/229 |
| 2013/0223258 | A1* | 8/2013 | Seo | H04B 7/084 |
| | | | | 370/252 |
| 2014/0169345 | A1* | 6/2014 | Seo | H04W 56/001 |
| | | | | 370/336 |
| 2016/0227427 | A1* | 8/2016 | Vajapeyam | H04W 24/00 |
| 2017/0171885 | A1* | 6/2017 | Hampel | H04W 74/0808 |
| 2017/0347297 | A1* | 11/2017 | Li | H04W 28/26 |
| 2017/0353865 | A1* | 12/2017 | Li | H04W 72/1284 |
| 2018/0167775 | A1* | 6/2018 | Tian | H04W 8/005 |
| 2018/0295622 | A1* | 10/2018 | Sadek | H04W 72/0453 |
| 2018/0308509 | A1* | 10/2018 | Balasubramanian | H04W 4/10 |
| 2019/0052502 | A1* | 2/2019 | Ren | H04B 7/26 |
| 2019/0090259 | A1* | 3/2019 | Oteri | H04W 28/0242 |
| 2020/0043241 | A1* | 2/2020 | Song | G10L 25/51 |
| 2020/0120199 | A1* | 4/2020 | Maeng | H04M 1/72454 |
| 2021/0029773 | A1* | 1/2021 | Majumder | H04W 8/183 |
| 2021/0067209 | A1* | 3/2021 | Gopal | H04B 7/0814 |

* cited by examiner

INTERFERENCE MITIGATION THROUGH SILENCING SIGNALS IN SHARED RADIO FREQUENCY SPECTRUM

CROSS REFERENCE

The present Application for Patent claims the benefit of U.S. Provisional Patent Application No. 62/971,334 by YERRAMALLI et al., entitled "INTERFERENCE MITIGATION THROUGH SILENCING SIGNALS IN SHARED RADIO FREQUENCY SPECTRUM," filed Feb. 7, 2020, assigned to the assignee hereof, and expressly incorporated by reference herein.

FIELD OF TECHNOLOGY

The following relates generally to wireless communications and more specifically to interference mitigation through silencing signals in shared radio frequency spectrum.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, wireless communications systems may use shared radio frequency spectrum in which a device that is to transmit performs a contention-based channel access procedure, such as a listen before talk (LBT) procedure (e.g., a clear channel assessment (CCA)), to confirm that a desired radio frequency spectrum band is not currently being used by another transmitter, prior to transmitting using the desired radio frequency spectrum band. Further, in some cases, the shared radio frequency spectrum may be in relatively high frequency bands (e.g., millimeter wave (mmW) frequency bands), in which signals from a transmitting device may experience relatively fast signal attenuation, which may result in a potentially interfering device not detecting sufficient energy in an LBT procedure to prevent the interfering device from initiating a transmission. In cases where the interfering device is in proximity to a receiving device that is to receive communications from the transmitting device, a transmission by the potentially interfering device may interfere with the communications from the transmitting device, which may lead communication inefficiencies, among other issues.

SUMMARY

The described techniques relate to improved methods, systems, devices, and apparatuses that support interference mitigation through silencing signals in shared radio frequency spectrum. Various aspects of the present disclosure provide for silencing signal transmissions by a user equipment (UE) that are transmitted periodically during downlink communications from a serving base station to the UE. The silencing signal transmissions may be configured by the base station and enabled in cases where potential interfering nodes are detected. The base station may configure a silencing signal format and periodicity upon detection of the presence of an interfering node such that silencing signals are transmitted by the UE when an interfering node is detected, and are not transmitted in the absence of detection of an interfering node. An interfering node may be notified that silencing signals are being used, and may adjust a periodicity or wait time of its listen before talk (LBT) procedures based on the silencing signal periodicity, and thus transmitting nodes in proximity to the base station or UE only modify LBT parameters in the event that nearby UEs would receive interference.

A method of wireless communication at a UE is described. The method may include establishing a connection with a base station using a shared radio frequency spectrum band, receiving, from the base station, configuration information for a silencing signal to be transmitted by the UE, receiving, from the base station, a first portion of a downlink communication via the shared radio frequency spectrum band, and transmitting, subsequent to the receiving the first portion of the downlink communication, a first instance of the silencing signal via the shared radio frequency spectrum band based on the configuration information.

An apparatus for wireless communication at a UE is described. The apparatus may include a processor, memory coupled with the processor, and instructions stored in the memory. The instructions may be executable by the processor to cause the apparatus to establish a connection with a base station using a shared radio frequency spectrum band, receive, from the base station, configuration information for a silencing signal to be transmitted by the UE, from the base station, a first portion of a downlink communication via the shared radio frequency spectrum band, and transmit, subsequent to the receiving the first portion of the downlink communication, a first instance of the silencing signal via the shared radio frequency spectrum band based on the configuration information.

Another apparatus for wireless communication at a UE is described. The apparatus may include means for establishing a connection with a base station using a shared radio frequency spectrum band, receiving, from the base station, configuration information for a silencing signal to be transmitted by the UE, receiving, from the base station, a first portion of a downlink communication via the shared radio frequency spectrum band, and transmitting, subsequent to the receiving the first portion of downlink communication, a first instance of the silencing signal via the shared radio frequency spectrum band based on the configuration information.

A non-transitory computer-readable medium storing code for wireless communication at a UE is described. The code may include instructions executable by a processor to establish a connection with a base station using a shared radio frequency spectrum band, receive, from the base station, configuration information for a silencing signal to be transmitted by the UE, receive, from the base station, a first portion of a downlink communication via the shared radio frequency spectrum band, and transmit, subsequent to the receiving the first portion of the downlink communication, a first instance of the silencing signal via the shared radio frequency spectrum band based on the configuration information.

Some examples of the method, apparatuses, and non-transitory computer-readable medium described herein may further include operations, features, means, or instructions for receiving, from the base station subsequent to the transmitting the first instance of the silencing signal, a second portion of the downlink communication via the shared radio frequency spectrum band, and transmitting, subsequent to the receiving the second portion of the downlink communication, a second instance of the silencing signal via the shared radio frequency spectrum band based on the configuration information.

Some examples of the method, apparatuses, and non-transitory computer-readable medium described herein may further include operations, features, means, or instructions for identifying a presence of a neighboring node on the shared radio frequency spectrum band, and transmitting, to the base station, an indication of the neighboring node, where the configuration information for the silencing signal is received responsive to the indication of the neighboring node. In some examples of the method, apparatuses, and non-transitory computer-readable medium described herein, the identifying the presence of the neighboring node may include operations, features, means, or instructions for sensing energy from the neighboring node that is above an interference threshold of the UE. In some examples of the method, apparatuses, and non-transitory computer-readable medium described herein, the configuration information indicates that transmissions of the silencing signal are activated for the downlink communication from the base station.

Some examples of the method, apparatuses, and non-transitory computer-readable medium described herein may further include operations, features, means, or instructions for transmitting an indication of the silencing signal to the neighboring node for use in an LBT procedure at the neighboring node.

In some examples of the method, apparatuses, and non-transitory computer-readable medium described herein, the configuration information is provided separately for each of two or more beams used for communications between the UE and the base station. In some examples of the method, apparatuses, and non-transitory computer-readable medium described herein, the configuration information corresponds to a first beam that is associated with a synchronization signal block (SSB) transmitted by the base station. Some examples of the method, apparatuses, and non-transitory computer-readable medium described herein may further include operations, features, means, or instructions for determining to transmit the silencing signal when the downlink communication use a beam that is quasi co-located (QCL) with the first beam.

In some examples of the method, apparatuses, and non-transitory computer-readable medium described herein, the configuration information includes an indication to activate transmission of the silencing signal, and where a subsequent reception of configuration information from the base station indicates to deactivate transmission of the silencing signal. In some examples of the method, apparatuses, and non-transitory computer-readable medium described herein, the configuration information includes an indication of wireless resources for transmission of the silencing signal. In some examples of the method, apparatuses, and non-transitory computer-readable medium described herein, the indication of wireless resources includes one or more of a starting slot of the silencing signal, a starting symbol of the silencing signal, a periodicity for transmitting instances of the silencing signal, an end symbol of the silencing signal, or any combinations thereof. In some examples of the method, apparatuses, and non-transitory computer-readable medium described herein, the configuration information may be received in radio resource control (RRC) signaling, in a medium access control (MAC) control element, in a downlink control information communication from the base station, or any combinations thereof.

In some examples of the method, apparatuses, and non-transitory computer-readable medium described herein, the configuration information includes format information for the silencing signal. In some examples of the method, apparatuses, and non-transitory computer-readable medium described herein, the format information includes one or more of a transmission bandwidth for the silencing signal, a scrambling identification to be applied to the transmission of the silencing signal, a reference signal to be used as the silencing signal, or any combinations thereof.

In some examples of the method, apparatuses, and non-transitory computer-readable medium described herein, the silencing signal may be transmitted on an uplink beam that is QCL with a downlink beam used for the downlink communication. In some examples of the method, apparatuses, and non-transitory computer-readable medium described herein, the silencing signal may be transmitted on an uplink beam that is directed toward an interfering neighboring node. In some examples of the method, apparatuses, and non-transitory computer-readable medium described herein, the silencing signal may be transmitted on an uplink beam having a wider beam angle than a downlink beam used for the downlink communication.

In some examples of the method, apparatuses, and non-transitory computer-readable medium described herein, the silencing signal may be transmitted using a same transmit power as used for uplink communications to the base station. In some examples of the method, apparatuses, and non-transitory computer-readable medium described herein, the silencing signal may be transmitted using a transmit power that is offset by a power offset value from an uplink transmit power used for uplink communications to the base station. In some examples of the method, apparatuses, and non-transitory computer-readable medium described herein, the silencing signal may be transmitted using a highest available transmit power of the UE. In some examples of the method, apparatuses, and non-transitory computer-readable medium described herein, the silencing signal may be transmitted using a transmit power that is determined based on a signal strength of interfering signals received from an interfering neighboring node.

A method of wireless communication at a base station is described. The method may include establishing a connection with a UE using a shared radio frequency spectrum band, transmitting, to the UE, configuration information for a silencing signal to be transmitted by the UE, transmitting a first portion of a downlink communication to the UE, and transmitting, subsequent to a gap following the first portion that is provided for an instance of the silencing signal, a second portion of the downlink communication to the UE.

An apparatus for wireless communication at a base station is described. The apparatus may include a processor, memory coupled with the processor, and instructions stored in the memory. The instructions may be executable by the processor to cause the apparatus to establish a connection with a UE using a shared radio frequency spectrum band, transmit, to the UE, configuration information for a silencing signal to be transmitted by the UE, transmit a first portion of a downlink communication to the UE, and transmit, subsequent to a gap following the first portion that is provided for an instance of the silencing signal, a second portion of the downlink communication to the UE.

Another apparatus for wireless communication at a base station is described. The apparatus may include means for establishing a connection with a UE using a shared radio frequency spectrum band, transmitting, to the UE, configuration information for a silencing signal to be transmitted by the UE, transmitting a first portion of a downlink communication to the UE, and transmitting, subsequent to a gap following the first portion that is provided for an instance of the silencing signal, a second portion of a downlink communication to the UE.

A non-transitory computer-readable medium storing code for wireless communication at a base station is described. The code may include instructions executable by a processor to establish a connection with a UE using a shared radio frequency spectrum band, transmit, to the UE, configuration information for a silencing signal to be transmitted by the UE, transmit a first portion of a downlink communication to the UE, and transmit, subsequent to a gap following the first portion that is provided for an instance of the silencing signal, a second portion of the downlink communication to the UE.

In some examples of the method, apparatuses, and non-transitory computer-readable medium described herein, the downlink communication includes multiple gaps provided for associated multiple instances of the silencing signal. Some examples of the method, apparatuses, and non-transitory computer-readable medium described herein may further include operations, features, means, or instructions for receiving, from the UE, an indication of a presence of a neighboring node on the shared radio frequency spectrum band, where the configuration information for the silencing signal is transmitted responsive to the indication of the neighboring node. Some examples of the method, apparatuses, and non-transitory computer-readable medium described herein may further include operations, features, means, or instructions for configuring the UE with an interference threshold, and where the indication of the presence of the neighboring node indicates that a signal strength of the neighboring node at the UE is above the interference threshold. In some examples of the method, apparatuses, and non-transitory computer-readable medium described herein, the configuration information indicates that transmissions of the silencing signal are activated for the downlink communication from the base station.

Some examples of the method, apparatuses, and non-transitory computer-readable medium described herein may further include operations, features, means, or instructions for transmitting an indication of the silencing signal to the neighboring node for use in an LBT procedure at the neighboring node.

In some examples of the method, apparatuses, and non-transitory computer-readable medium described herein, the configuration information may be provided separately for each of two or more beams used for communications between the UE and the base station. In some examples of the method, apparatuses, and non-transitory computer-readable medium described herein, the configuration information corresponds to a first beam that may be associated with a SSB transmitted by the base station. Some examples of the method, apparatuses, and non-transitory computer-readable medium described herein may further include operations, features, means, or instructions for determining to transmit the downlink communication with one or more gaps for silencing signals when the downlink communication uses a beam that is QCL with the first beam.

In some examples of the method, apparatuses, and non-transitory computer-readable medium described herein, the configuration information includes an indication to activate transmission of the silencing signal. In some examples of the method, apparatuses, and non-transitory computer-readable medium described herein, the configuration information includes an indication of wireless resources for transmission of the silencing signal. In some examples of the method, apparatuses, and non-transitory computer-readable medium described herein, the indication of wireless resources includes one or more of a starting slot of the silencing signal, a starting symbol of the silencing signal, a periodicity for transmitting instances of the silencing signal, an end symbol of the silencing signal, or any combinations thereof. In some examples of the method, apparatuses, and non-transitory computer-readable medium described herein, the configuration information may be transmitted in RRC signaling, in a MAC control element, in a downlink control information communication to the UE, or any combinations thereof.

In some examples of the method, apparatuses, and non-transitory computer-readable medium described herein, the configuration information includes format information for the silencing signal. In some examples of the method, apparatuses, and non-transitory computer-readable medium described herein, the format information includes one or more of a transmission bandwidth for the silencing signal, a scrambling identification to be applied to the transmission of the silencing signal, a reference signal to be used as the silencing signal, or any combinations thereof.

In some examples of the method, apparatuses, and non-transitory computer-readable medium described herein, the silencing signal may be configured to be transmitted on an uplink beam that is QCL with a downlink beam used for the downlink communication. In some examples of the method, apparatuses, and non-transitory computer-readable medium described herein, the silencing signal may be configured to be transmitted on an uplink beam that is directed toward an interfering neighboring node. In some examples of the method, apparatuses, and non-transitory computer-readable medium described herein, the silencing signal is configured to be transmitted on an uplink beam having a wider beam angle than a downlink beam used for the downlink communication.

In some examples of the method, apparatuses, and non-transitory computer-readable medium described herein, the configuration information indicates to transmit the silencing signal using a same transmit power as used for uplink communications to the base station. In some examples of the method, apparatuses, and non-transitory computer-readable medium described herein, the configuration information indicates to transmit the silencing signal using a transmit power that is offset by a power offset value from an uplink transmit power used for uplink communications to the base station. In some examples of the method, apparatuses, and non-transitory computer-readable medium described herein, the configuration information indicates to transmit the silencing signal using a highest available transmit power of the UE. In some examples of the method, apparatuses, and non-transitory computer-readable medium described herein, the configuration information indicates to transmit the silencing signal using a transmit power that is determined based on a signal strength of interfering signals received from an interfering neighboring node.

A method of wireless communication at a first wireless node is described. The method may include receiving, from a second wireless node, an indication that a silencing signal is enabled for communications of the second wireless node using a shared radio frequency spectrum band, setting a wait time associated with an LBT procedure based on the indication that the silencing signal is enabled, and performing the LBT procedure based on the wait time to determine availability of the shared radio frequency spectrum band for a transmission of the first wireless node.

An apparatus for wireless communication at a first wireless node is described. The apparatus may include a processor, memory coupled with the processor, and instructions stored in the memory. The instructions may be executable by the processor to cause the apparatus to receive, from a second wireless node, an indication that a silencing signal is enabled for communications of the second wireless node using a shared radio frequency spectrum band, set a wait time associated with an LBT procedure based on the indication that the silencing signal is enabled, and perform the LBT procedure based on the wait time to determine availability of the shared radio frequency spectrum band for a transmission of the first wireless node.

Another apparatus for wireless communication at a first wireless node is described. The apparatus may include means for receiving, from a second wireless node, an indication that a silencing signal is enabled for communications of the second wireless node using a shared radio frequency spectrum band, setting a wait time associated with an LBT procedure based on the indication that the silencing signal is enabled, and performing the LBT procedure based on the wait time to determine availability of the shared radio frequency spectrum band for a transmission of the first wireless node.

A non-transitory computer-readable medium storing code for wireless communication at a first wireless node is described. The code may include instructions executable by a processor to receive, from a second wireless node, an indication that a silencing signal is enabled for communications of the second wireless node using a shared radio frequency spectrum band, set a wait time associated with an LBT procedure based on the indication that the silencing signal is enabled, and perform the LBT procedure based on the wait time to determine availability of the shared radio frequency spectrum band for a transmission of the first wireless node.

In some examples of the method, apparatuses, and non-transitory computer-readable medium described herein, the indication that the silencing signal is enabled is received in a transmission from a neighboring base station. In some examples of the method, apparatuses, and non-transitory computer-readable medium described herein, the transmission from the neighboring base station may be a physical broadcast channel (PBCH) or a remaining minimum system information (RMSI) transmission that indicates a periodicity of the silencing signal, and where the wait time is determined based on the periodicity of the silencing signal.

In some examples of the method, apparatuses, and non-transitory computer-readable medium described herein, the indication that the silencing signal is enabled is received in a transmission from a UE. In some examples of the method, apparatuses, and non-transitory computer-readable medium described herein, the transmission from the UE may be received on a complaint channel used for indicating that silencing signals are enabled. In some examples of the method, apparatuses, and non-transitory computer-readable medium described herein, the complaint channel may be a random access channel (RACH) that uses a configured RACH occasion for complaint indications.

DETAILED DESCRIPTION

Figure 1:
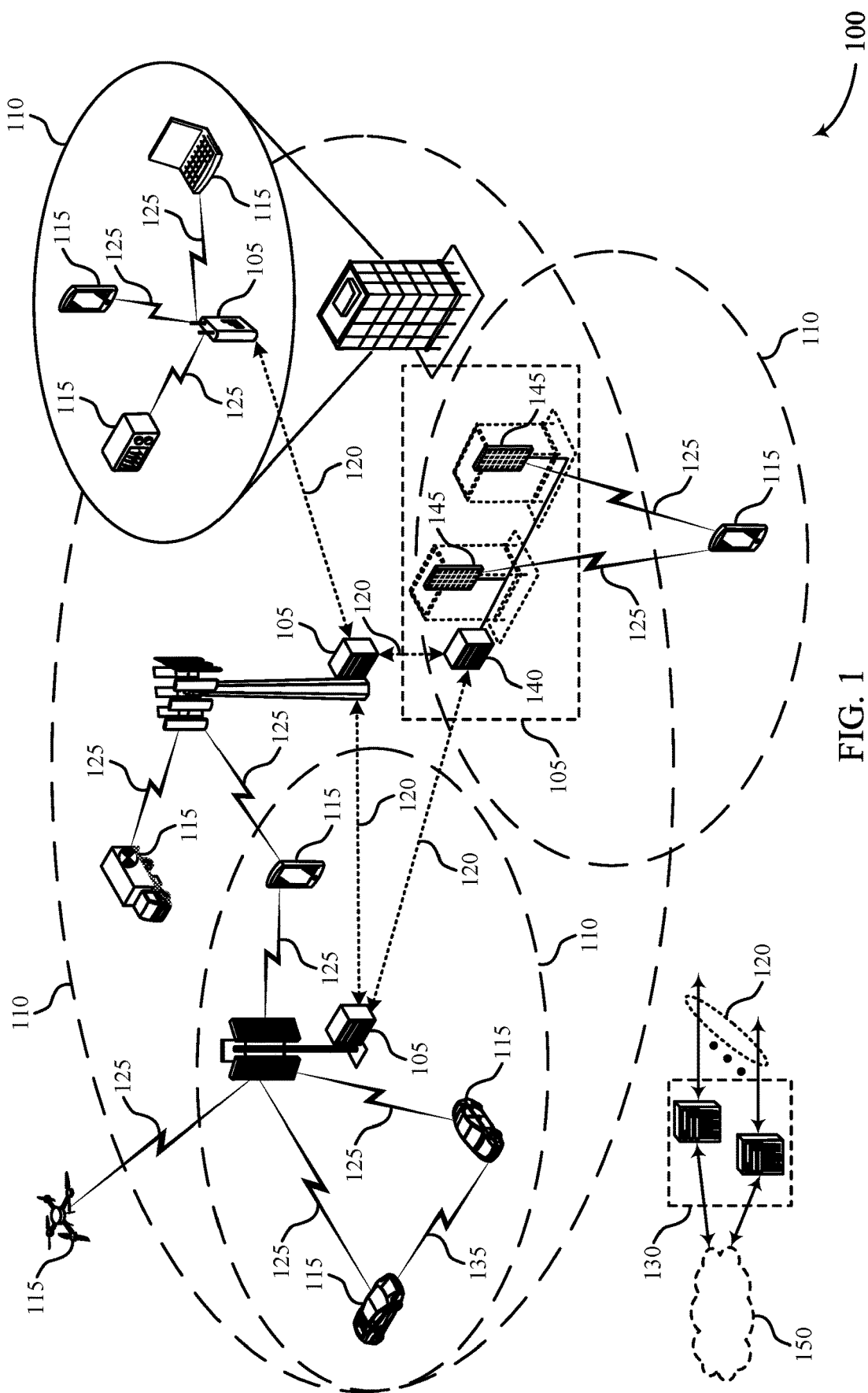
FIG. 1 illustrates an example of a wireless communications system that supports interference mitigation through silencing signals in shared radio frequency spectrum in accordance with aspects of the present disclosure.

In some deployments, wireless communications systems may operate in millimeter wave (mmW) frequency ranges (e.g., 24 gigahertz (GHz), 26 GHz, 28 GHz, 39 GHz, 52.6-71 GHz, etc.). Wireless communications at these frequencies may be associated with increased signal attenuation (e.g., path loss, penetration loss, blockage loss), which may be influenced by various factors, such as but not limited to diffraction, propagation environment, density of blockages, material properties. As a result, signal processing techniques, such as beamforming, may be used to coherently combine energy and overcome the path losses at these frequencies. Due to the increased amount of path, penetration and blockage losses in mmW communications systems, transmissions between wireless devices (e.g., from a base station or a user equipment (UE)) may be beamformed. Moreover, a receiving device may use beamforming techniques to configure antenna(s) or antenna array(s) or antenna array module(s) such that transmissions are received in a directional manner.

Further, in some cases wireless communications systems may use shared radio frequency spectrum in which a device that is to transmit (e.g., a base station) performs a contention-based channel access procedure, such as a listen before talk (LBT) procedure (e.g., a clear channel assessment (CCA)), to confirm that a radio frequency spectrum band is currently unused prior to transmitting using the radio frequency spectrum band. In cases where the shared radio frequency spectrum uses a mmW frequency band that uses beamformed communications, a potentially interfering node may not detect transmissions from the base station due to, for example, signal attenuation resulting in received energy at the potentially interfering node being below an LBT threshold, beamforming resulting in the potentially interfering node not detecting energy from the base station, or combinations thereof. In cases where the interfering node is in proximity to a asUE that is to receive downlink communications from the base station, a transmission by the potentially interfering node may interfere with the downlink communications from the base station.

Various techniques as discussed herein provide for silencing signal transmissions from a UE (or any other receiving device) that efficiently reduce potentially interfering transmissions from an interfering node. In some cases, the UE may transmit periodic silencing signals during downlink communications from the base station to the UE. The silencing signal transmissions may be configured by the base station and enabled in cases where one or more potential interfering nodes are detected. The base station, in some cases, may configure a silencing signal format and periodicity upon detection of the presence of an interfering node. Such techniques provide that silencing signals are transmitted by the UE only when an interfering node is detected, and are not transmitted in the absence of detection of an interfering node.

In some cases, an interfering node may be notified that silencing signals are being used, and may adjust a periodicity or wait time of its LBT procedures based on the silencing signal periodicity, and thus transmitting nodes in proximity to the base station or UE only modify LBT parameters in the event that nearby UEs would receive interference. In some cases, the base station may provide the indication to the interfering node in one or more broadcast, groupcast, or unicast signals from the base station (e.g., in remaining minimum system information (RMSI), physical broadcast control channel (PBCH) transmissions, or other signal from the existing base station that may be used by the interfering node prior to starting transmissions on the medium). In other cases, the UE may provide the indication to the interfering node, such as in a complaint channel (e.g., a random access channel (RACH) resource configured to allow for indications of interfering transmissions), or other type of communications to the interfering node from the UE to provide an indication that silencing signal is being transmitted.

The interfering node may use the indication of the interfering signal to modify a periodicity or wait time of its LBT procedure to ensure that silencing signal transmissions from the UE will be detected at the interfering node. In some cases, the interfering node may only modify the LBT procedure based on an indication that the silencing signal is enabled at the UE, which may allow for enhanced throughput at the interfering node as modifications to the LBT procedure may be made responsive to the silencing signal configuration. Further, a UE using such techniques will transmit the silencing signals when enabled, and thus the UE may save power, and system resources associated with the silencing signals may be reduced relative to cases where the silencing signal is not transmitted or transmitted according to a fixed schedule without regard to whether a potentially interfering node is detected.

Aspects of the disclosure are initially described in the context of wireless communications systems. wireless resources for downlink communications and silencing signal transmissions, and process flows, are then discussed. Aspects of the disclosure are further illustrated by and described with reference to apparatus diagrams, system diagrams, and flowcharts that relate to interference mitigation through silencing signals in shared radio frequency spectrum.

FIG. 1 illustrates an example of a wireless communications system 100 that supports interference mitigation through silencing signals in shared radio frequency spectrum in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples. In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example in the range of 300 megahertz (MHz) to 300 GHz. Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support mmW communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some cases, as discussed herein, beamformed communications may use mmW frequencies, which may result in a potential interfering node 155 that is in proximity with a receiving device (e.g., a UE 115) may not detect a signal from a transmitter (e.g., a base station 105) that is in communication with the receiving device (e.g., due to signal attenuation, being outside of the beam used by the transmitter and receiving device, etc.). In some cases, in order to prevent signals from such an interfering node 155, techniques as discussed herein may be used to provide for silencing signal transmissions from a UE 115 (or any other device). Such silencing signals can efficiently reduce potentially interfering transmissions from an interfering node 155. In some cases, a UE 115 may transmit periodic silencing signals during downlink communications from a base station 105 to the UE 115. The silencing signal transmissions may be configured by the base station 105 and enabled in cases where one or more potential interfering nodes 155 are detected. The base station 105, in some cases, may configure a silencing signal format and periodicity upon detection of the presence of an interfering node 155. Such techniques provide that silencing signals are transmitted by the UE 115 when an interfering node 155 is detected, and are not transmitted in the absence of detection of an interfering node 155.

In some cases, an interfering node 155 may be notified that silencing signals are being used, and may adjust a periodicity or wait time of its LBT procedures based on the silencing signal periodicity, and thus potential interfering nodes 155 in proximity to the base station 105 or UE 115 only modify LBT parameters in the event that nearby UEs 115 would receive interference. In some cases, the base station 105 may provide the indication to the interfering node 155 in one or more broadcast, groupcast, or unicast signals from the base station 105 (e.g., in RMSI, PBCH, or other signal from the base station 105 that may be used by the interfering node 155 prior to starting transmissions on the medium). In other cases, the UE 115 may provide the indication to the interfering node 155, such as in a complaint channel (e.g., a RACH resource configured to allow for indications of interfering transmissions), or other type of communications to the interfering node 155 from the UE 115 to provide an indication that silencing signal is being transmitted.

Figure 2:
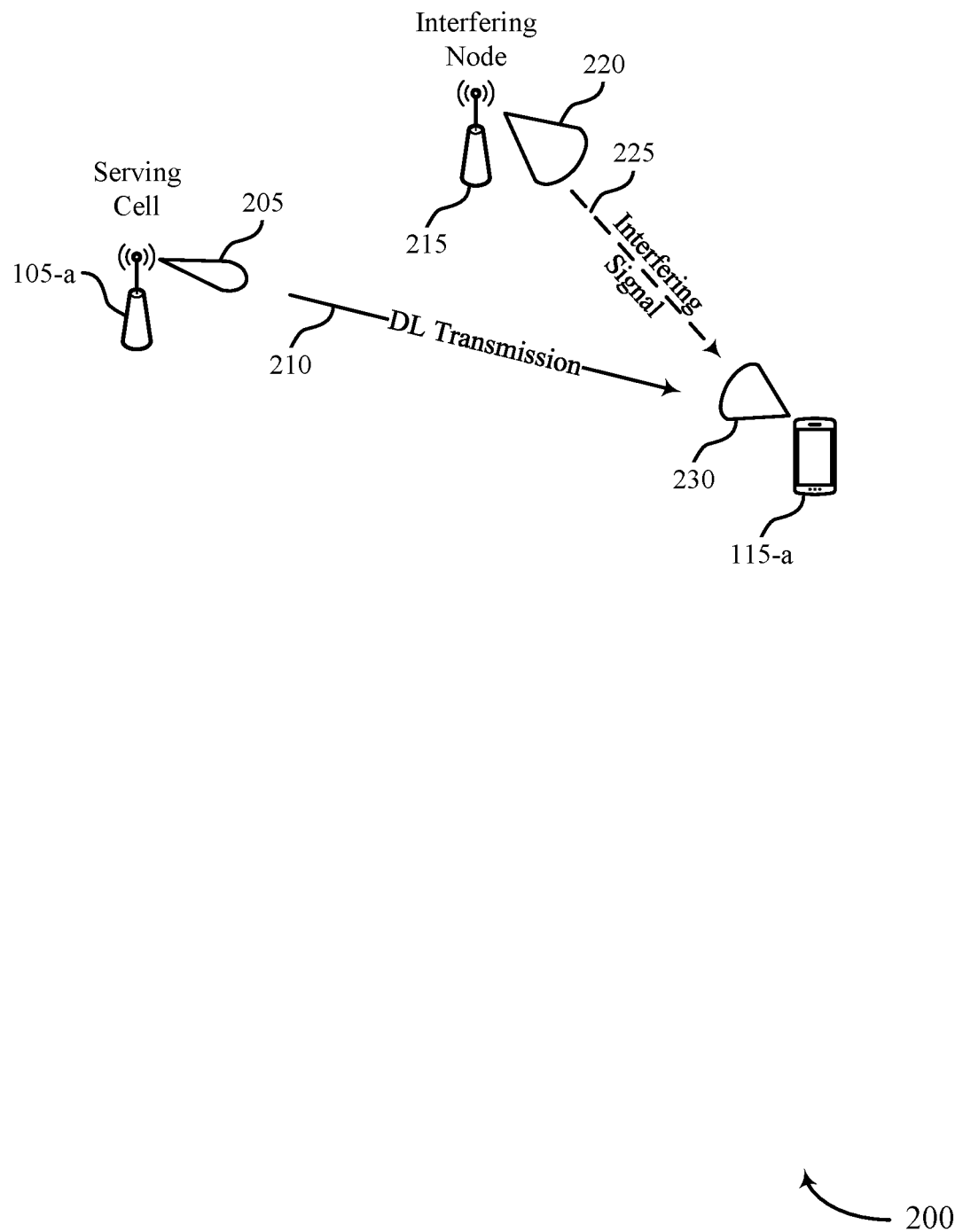
FIG. 2 illustrates an example of a portion of a wireless communications system that supports interference mitigation through silencing signals in shared radio frequency spectrum in accordance with aspects of the present disclosure.

FIG. 2 illustrates an example of a wireless communications system 200 that supports interference mitigation through silencing signals in shared radio frequency spectrum in accordance with aspects of the present disclosure. In some examples, wireless communications system 200 may implement aspects of wireless communications system 100. For instance, wireless communications system may include UE 115-a and base station 105-a that provide a serving cell for the UE 115-a, and an interfering node 215. The UE 115-a and base station 105-a may be examples of a UE 115 and a base station 105, respectively, as described with reference to FIG. 1, that operate in a shared radio frequency spectrum band. Further, the interfering node 215 may be an example of a base station 105 of FIG. 1 (e.g., a base station 105 of another operator), or may be any other type of transmitter that uses shared radio frequency spectrum that overlaps with the radio frequency spectrum band of the UE 115-a and base station 105-a.

Base station 105-a may use a transmit beam 205 to transmit downlink communications 210 to the UE 115-a. When initiating the transmission of the downlink communications 210, the base station 105-a may perform a contention-based channel access procedure, such as an LBT procedure, to confirm that the shared radio frequency spectrum band is not being used by another transmitter. The interfering node 215, which may be an example of a neighboring node as used herein, may also use the shared radio frequency spectrum for communications and may use interfering node beam 220 to transmit a potentially interfering signal 225. In cases where the interfering node 215 performs an LBT procedure prior to transmitting potentially interfering signal 225 and detects sufficient energy from the downlink communications 210 do determine that the medium is occupied, the interfering node 215 may refrain from transmitting and perform a subsequent LBT procedure based on a contention window (e.g., using a backoff counter that is adjusted in the event that the LBT procedure fails) that is used for LBT determinations at the interfering node 215. In such cases, the UE 115-a may receive and decode downlink communications 210 using beamforming parameters such as corresponding to UE beam 230 (e.g., a beam that is quasi co-located (QCL) with the transmit beam 205).

In other cases, the interfering node 215 may perform the LBT procedure and determine that the shared radio frequency spectrum band is available for transmissions, and may initiate transmission of the potentially interfering signal 225 using interfering node beam 220. In cases where the base station 105-a or UE 115-a are not transmitting, such techniques provide for fair access to the shared radio frequency spectrum band. However, in some cases the interfering node 215 may perform an LBT procedure and not detect, for example, downlink communications 210 from the base station 105-a. For example, the signal strength of the downlink communications 210 may have attenuated such that the interfering node 215 does not detect sufficient energy to cause an LBT failure. In other cases, due to the directional nature of the downlink communications 210 from the base station 105-a to the UE 115-a, the interfering node 215 may be outside of a beam path of the downlink communications 210 such that the interfering node 215 does not detect sufficient energy to cause an LBT failure. In such cases, if the interfering node 215 starts transmitting the potentially interfering signal 225, the transmission may result in receive interference at the UE 115-a that is sufficient to result in a failed decoding of the downlink communications 210. Such interference may occur, for example, when the interfering node 215 is in proximity to the UE 115-a or in cases where the UE 115-a is located in or near a beam path between the interfering node 215 and a receiver associated with the interfering node 215.

In order to help prevent such a potentially interfering signal 225 from interfering with downlink communications 210, in accordance with various techniques as discussed herein, the UE 115-a may transmit a silencing signal 235 that can be used reduce the likelihood that the LBT procedure at the interfering node 215 passes. In some cases, the UE may transmit periodic silencing signals 235 during the downlink communications 210 from the base station 105-a. In some cases, the silencing signal 235 may be configured by the base station 105-a and enabled in cases where one or more potential interfering nodes 215 are detected. The base station 105-a, in some cases, may configure a silencing signal format and periodicity upon detection of the presence of the interfering node 215.

In some cases, the UE 115-a may detect the interfering node 215 through one or more measurements of neighboring nodes that may be performed at the UE 115-a, and the UE 115-a may provide an indication of the interfering node 215 to the base station 105-a. For example, the UE 115-a may sense energy from the interfering node 215 that is above an interference threshold of the UE In other cases, the base station 105-a may determine the presence of the interfering node 215 through measurements at the base station 105-a, through information received from one or more other UEs 115 or base stations 105, through information received from a core network or another network node, or any combinations thereof.

In some cases, based on the identification of the interfering node 215, the base station 105-a may configure and enable transmissions of the silencing signal 235 by the UE 115-a. Such techniques provide that the silencing signal 235 transmissions are made by the UE 115-a only when the interfering node 215 is detected, and not in the absence of detection of the interfering node. Such techniques advantageously provide enhanced reliability of communications between the base station 105-a and the UE 115-a through reduced likelihood of interference at the UE 115-a, efficient usage of wireless resources, and reduced power consumption for the UE 115-a relative to cases where the silencing signal 235 transmissions may occur irrespective of whether the interfering node 215 is detected or not. In some cases, the silencing signal 235 may be transmitted using UE beam 230 that may be QCL with the transmit beam 205. In other cases, the silencing signal 235 may be transmitted using UE beam 230 that corresponds to a beam direction of the interfering node 215. In further cases, the silencing signal 235 may be transmitted using a wider beam than used for communications with the base station 105-a.

In some cases, the interfering node 215 may be notified that silencing signal 235 transmissions are being used, and may adjust a periodicity or wait time of its LBT procedures based on the silencing signal configuration (e.g., a wait time for the LBT procedure may be set to provide LBT during transmission of a periodic silencing signal 235 transmission). In some cases, the LBT procedure at the interfering node 215 may be adjusted only in the event that an indication is provided to the interfering node 215 to indicate usage of the silencing signal 235. Thus, transmitting nodes in proximity to the base station 105-a or UE 115-a only modify LBT parameters in the event that nearby UEs 115 would receive interference. In some cases, the base station 105-a may provide the indication to the interfering node 215 in one or more broadcast, groupcast, or unicast signals from the base station 105-a (e.g., in RMSI, PBCH, or other signals). In other cases, the UE 115-a may provide the indication to the interfering node 215, such as in a complaint channel transmission. In some cases, the interfering node 215 may provide complaint channel resources (e.g., a RACH resource configured to allow for indications of interfering transmissions) that may be used by the UE 115-a to indicate the silencing signal 235 and related configuration information (e.g., periodicity, frequency channel, channel bandwidth, etc.). In some cases, the configuration of the complaint channel may be provided in system information that is transmitted by the interfering node 215 (e.g., in a system information block (SIB) transmitted by the interfering node 215 using PBCH).

Figure 3:
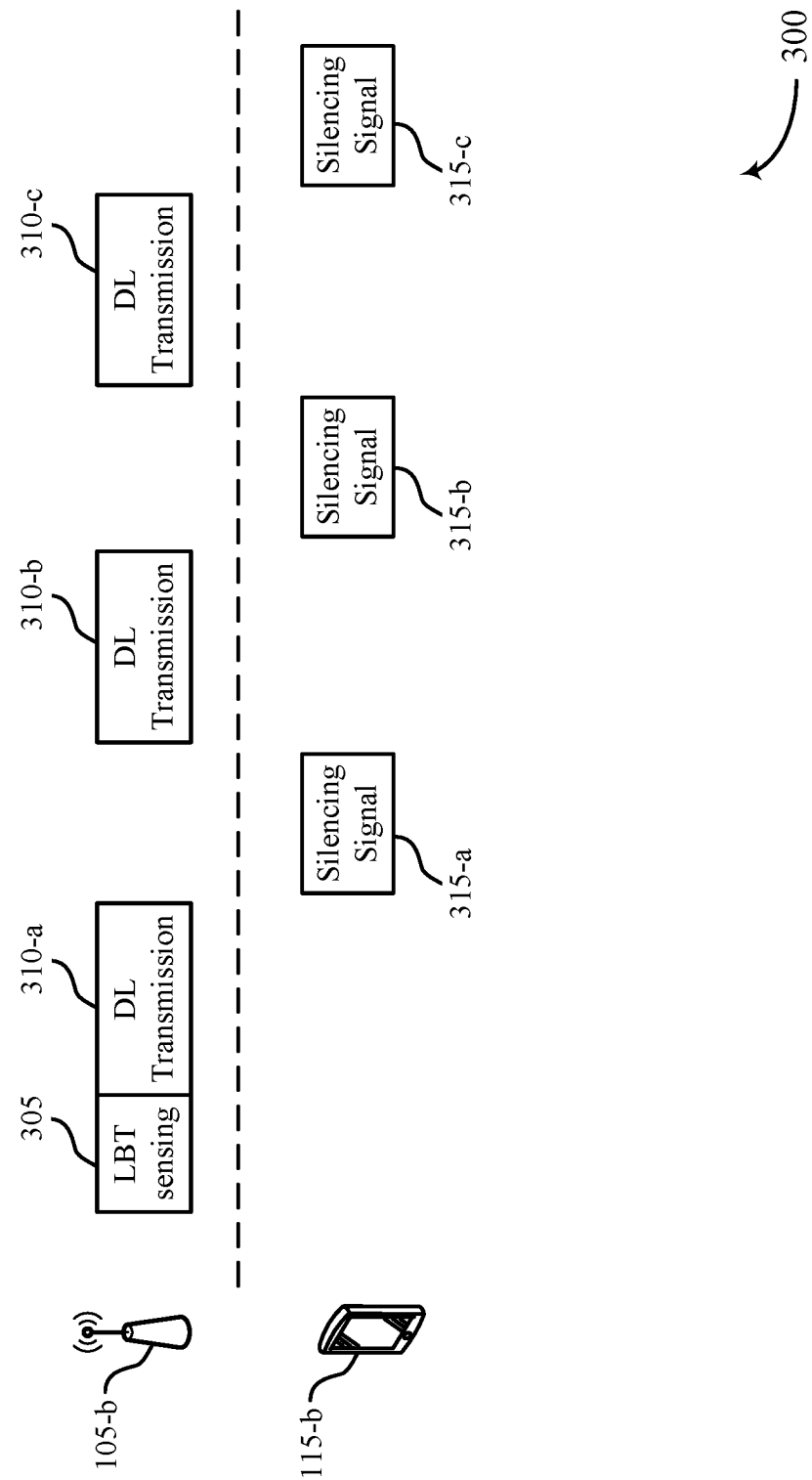
FIG. 3 illustrates an example of time resources for downlink communications and silencing signals that supports interference mitigation through silencing signals in shared radio frequency spectrum in accordance with aspects of the present disclosure.

FIG. 3 illustrates an example of time resources for downlink communications and silencing signals 300 that supports interference mitigation through silencing signals in shared radio frequency spectrum in accordance with aspects of the present disclosure. In some examples, time resources for downlink communications and silencing signals 300 may implement aspects of wireless communications system 100 or 200. In this example, a base station 105-b and a UE 115-b, which may be examples of a base station 105 and a UE 115, respectively, as described with reference to FIGS. 1 and 2, may communicate using shared radio frequency spectrum.

In this example, the base station 105-b may perform channel sensing such as LBT sensing 305 in associated with an LBT procedure to confirm that the shared radio frequency spectrum is available for transmissions. Following a successful LBT procedure, the base station 105-b may transmit a first portion of a downlink transmission 310-a. The UE 115-b may be configured to transmit a first instance of a silencing signal 315-a after the first portion of the downlink transmission 310-a, which may serve to prevent another transmitter (e.g., an interfering node) in proximity to the UE 115-b from accessing the shared radio frequency spectrum. Subsequent to the first instance of the silencing signal 315-a, the base station 105-b may transmit a second portion of the downlink transmission 310-b, followed by a second instance of the silencing signal 315-b, a third portion of the downlink transmission 310-c and a third instance of the silencing signal 315-c, and so on for the duration of the downlink transmission 310.

In some cases, prior to starting the downlink transmission 310, the base station 105-b may configure the UE 115-b for silencing signal (or blocking signal) transmissions. In some cases, the configuration may be provided in response to the UE 115-b or base station 105-b determining that a potentially interfering node is present. In some cases, the base station 105-b may provide configuration information to the UE 115-b on a per beam basis (e.g., silencing signal configuration is provided per synchronization signal block (SSB) beam, or per one or more other beams used at the UE 115-b). In such cases, in the event that the UE 115-b receives on a beam which is QCL linked to a given SSB beam, then the UE 115-b may be expected to transmit the silencing signal 315. In some cases, the silencing signal configuration may indicate a format and resources for the silencing signal 315. For example, the base station 105-b may provide resources to transmit the silencing signal 315 (e.g., a starting slot, a starting symbol, periodicity of transmissions, ending symbol, etc.). In some cases, the configuration information for the silencing signal 315 may be provided in RRC signaling, in a MAC control element (MAC-CE), in dynamic downlink control information (DCI) that provides a resource allocation for the downlink transmission 310, or any combinations thereof. Additionally or alternatively, the silencing signal configuration may provide a format of the silencing signal 315. Such format information may include, for example, a transmission bandwidth, scrambling identification, and the like. In some cases, the silencing signal 315 may use a same format as a sounding reference signal (SRS) transmitted by the UE 115-b.

In some cases, the silencing signal 315 may be transmitted by the UE 115-b using an uplink beam that corresponds to a downlink beam used to receive the downlink transmissions 310. In some cases, the silencing signal 315 may be transmitted on a beam that best blocks one or more identified interfering nodes, which may help to compensate for the power imbalance between the UE 115-b and the interfering node. In some cases, the silencing signal 315 may be transmitted using a wide beam which can cover one or more interfering nodes as determined by the UE 115-b or configured by the base station 105-b. The silencing signal configuration may also include power control information. In some cases, the UE 115-b may use a same power control as used for physical uplink control channel (PUCCH), physical uplink share channel (PUSCH), SRS (e.g., that may be configured at the UE 115-b), or an offset from such a power control value (e.g., that may be configured at the UE 115-b). In other cases, the UE 115-b may use a full amount of available power for the silencing signal 315 transmission. In further cases, the UE 115-b may derive power control parameters by measuring a path loss to the interfering node and compensating for an effective isotropic radiated power (EIRP) difference based on the measured path loss.

Figure 4:
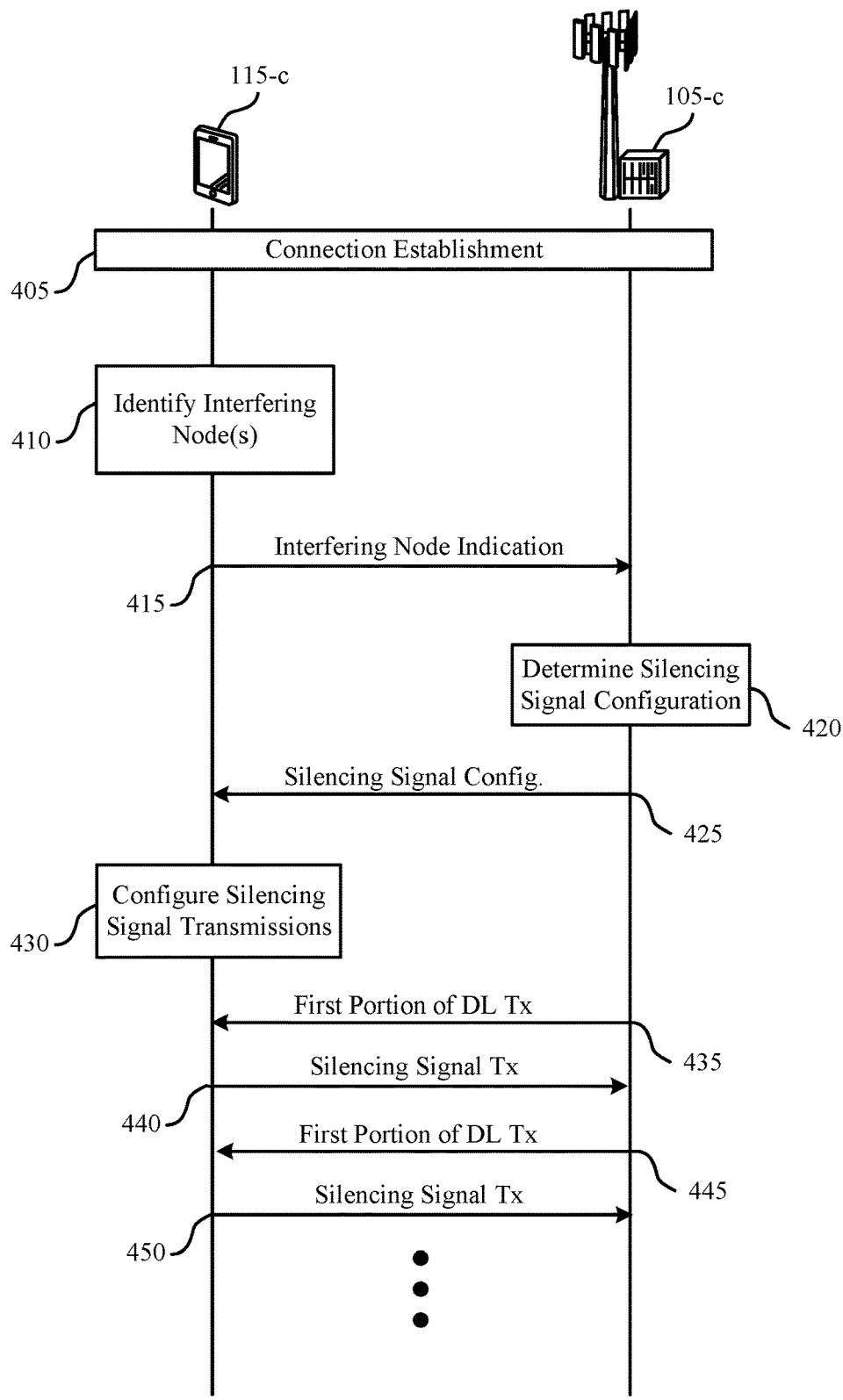
FIGS. 4 and 5 illustrate examples of a process flow that supports interference mitigation through silencing signals in shared radio frequency spectrum in accordance with aspects of the present disclosure.

FIG. 4 illustrates an example of a process flow 400 that supports interference mitigation through silencing signals in shared radio frequency spectrum in accordance with aspects of the present disclosure. In some examples, process flow 400 may implement aspects of wireless communications system 100 or 200. Process flow 400 may be implemented by a UE 115-c and a base station 105-c, which may be examples of UEs and base stations as described herein. In the following description of the process flow 400, the communications between the UE 115-c and the base station 105-c may be transmitted in a different order than the example order shown, or the operations performed by the UE 115-c and the base station 105-c may be performed in different orders or at different times. Some operations may also be omitted from the process flow 400, and other operations may be added to the process flow 400.

At 405, the UE 115-c and the base station 105-c may establish a connection and initiate communications. In some cases, the UE 115-c and base station 105-c may perform an RRC connection establishment or re-establishment procedure to establish a connection using shared radio frequency spectrum in the mmW frequency band. In some cases, the UE 115-c and base station 105-c may perform one or more beam training procedures to establish one or more beams (e.g., preferred, suitable, or selected beams) for communications. In some cases, as part of the connection establishment, the base station 105-c may configure the UE 115-c with one or more silencing signal configurations (e.g., a silencing signal configuration is provided per SSB beam, or per one or more other beams used at the UE 115-c). In some cases, the base station 105-c may configure the UE 115-c to provide an indication to the base station 105-c in the event that the UE 115-c detects an interfering node.

At 410, the UE 115-c may detect one or more interfering nodes. In some cases, the UE 115-c may measure signals received from neighboring cells (e.g., in a neighbor cell measurement procedure), and may provide a report of such measurements to the base station 105-c. At 415, the UE 115-c may transmit an interfering node indication to the base station 105-c. As indicated, in some cases the interfering node indication may be provided in a neighbor cell measurement report. In other cases, the interfering node indication may be provided by the UE 115-c as a separate indication. In some cases, the interfering node indication may be provided in uplink control information (UCI), in a MAC-CE, via RRC, or via other signaling to the base station 105-c.

At 420, the base station 420 may determine a silencing signal configuration. In some cases, the base station 105-c may determine the silencing signal configuration based on information provided with the interfering node indication received from the UE 115-c. For example, the base station 105-c may determine an SSB associated with the interfering node, and configure the silencing signal based on the determined SSB. In some cases, the silencing signal configuration may include a starting slot of the silencing signal, a starting symbol of the silencing signal, a periodicity for transmitting instances of the silencing signal, an end symbol of the silencing signal, or any combinations thereof. In some cases, the silencing signal configuration may be selected from a configured mapping of silencing signal configurations and an index value associated with the mapping may be used to indicate the silencing signal configuration. In some cases, the base station 105-c may determine that subsequent downlink communications to the UE 115-c are to include periodic gaps based on the silencing signal configuration that allow for the UE 115-c to transmit instances of the silencing signal.

At 425, the base station 105-c may transmit silencing signal configuration information to the UE 115-c. In some cases, the silencing signal configuration information may be transmitted in a MAC-CE, in DCI, or in RRC signaling to the UE 115-c. In some cases, the silencing signal configuration information may include all of a subset of silencing signal configuration parameters, such as a starting slot of the silencing signal, a starting symbol of the silencing signal, a periodicity for transmitting instances of the silencing signal, an end symbol of the silencing signal, or any combinations thereof. In some cases, the silencing signal configuration information may include an index value that is mapped to a configured silencing signal configuration (e.g., a specified mapping, a set of available silencing signal configurations provided by RRC, and the like). In some cases, the silencing signal configuration information may include an indication to start transmissions of silencing signals during downlink communications to the UE 115-c. In some cases, the interfering node indication may signal that the interfering node is no longer active, and the silencing signal configuration may indicate to discontinue transmissions of silencing signals.

At 430, the UE 115-c may configure the silencing signal transmissions based on the silencing signal configuration information received from the base station 105-c. At 435, the base station 105-c may transmit a first portion of a downlink communication, which may be received at the UE 115-c. At 440, the UE 115-c may transmit a first instance of the silencing signal. At 445, the base station 105-c may transmit a second portion of the downlink communication, which may be received at the UE 115-c. Optionally, at 450, the UE 115-c may transmit a second instance of the silencing signal, in the case that additional portions of the downlink communication are to be transmitted in a downlink allocation to the UE 115-c. Further portions of downlink communications and associated further instances of the silencing signal may be transmitted until the end of the allocated downlink resources.

Figure 5:
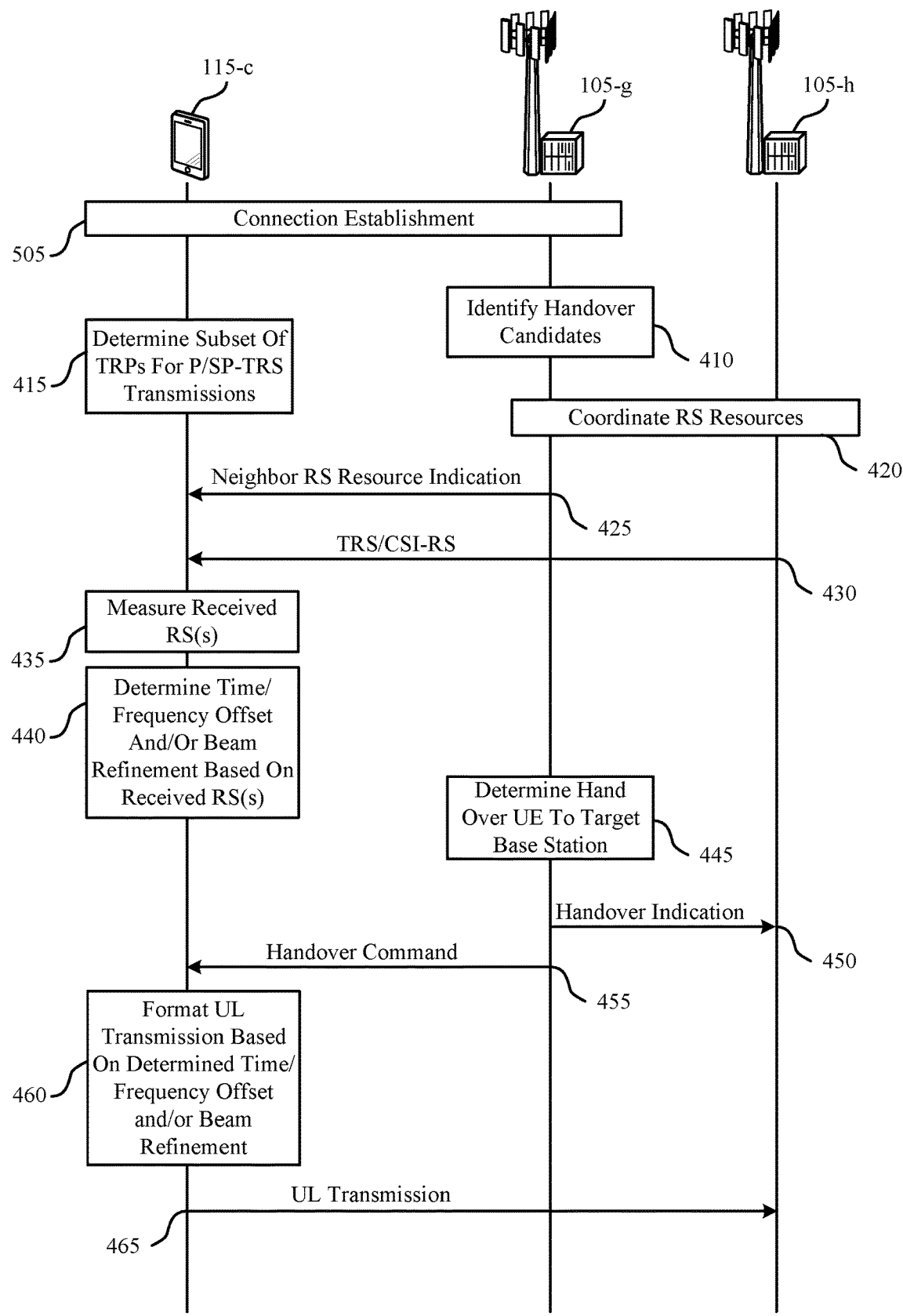

FIG. 5 illustrates an example of a process flow 500 that supports interference mitigation through silencing signals in shared radio frequency spectrum in accordance with aspects of the present disclosure. In some examples, process flow 500 may implement aspects of wireless communications system 100 or 200. Process flow 500 may be implemented by a UE 115-d, a serving base station 105-d, and an interfering base station 105-e, which may be examples of UEs and base stations as described herein. In the following description of the process flow 500, the communications between the UE 115-d and the base stations 105 may be transmitted in a different order than the example order shown, or the operations performed by the UE 115-d and the base stations 105 may be performed in different orders or at different times. Some operations may also be omitted from the process flow 500, and other operations may be added to the process flow 500.

At 505, the UE 115-d and the serving base station 105-d may establish a connection and initiate communications. In some cases, the UE 115-d and serving base station 105-d may perform an RRC connection establishment or re-establishment procedure to establish a connection using shared radio frequency spectrum in the mmW frequency band. In some cases, the UE 115-d and serving base station 105-d may perform one or more beam training procedures to establish one or more beams (e.g., preferred, suitable, or selected beams) for communications. In some cases, as part of the connection establishment, the serving base station 105-d may configure the UE 115-d with one or more silencing signal configurations (e.g., a silencing signal configuration is provided per SSB beam, or per one or more other beams used at the UE 115-d). In some cases, the serving base station 105-d may configure the UE 115-d to provide an indication to the serving base station 105-d in the event that the UE 115-d detects an interfering node.

At 510, the interfering base station 105-e may transmit one or more interfering node transmissions. Such transmissions may include, for example, reference signal transmissions, SSB transmissions, or combinations thereof. At 515, the UE 115-d may detect the interfering node transmissions and identify the interfering base station 105-e. At 520, the UE 115-d may transmit an interfering node indication to the serving base station 105-d. As indicated, in some cases the interfering node indication may be provided in a neighbor cell measurement report. In other cases, the interfering node indication may be provided by the UE 115-d as a separate indication. In some cases, the interfering node indication may be provided in UCI, in a MAC-CE, via RRC, or via other signaling to the base station 105-d.

At 525, the serving base station 105-d may determine a silencing signal configuration. In some cases, the serving base station 105-d may determine the silencing signal configuration based on information provided with the interfering node indication received from the UE 115-d. For example, the base station 105-d may determine a SSB associated with the interfering node, and configure the silencing signal based on the determined SSB. In some cases, the silencing signal configuration may include a starting slot of the silencing signal, a starting symbol of the silencing signal, a periodicity for transmitting instances of the silencing signal, an end symbol of the silencing signal, or any combinations thereof. In some cases, the silencing signal configuration may be selected from a configured mapping of silencing signal configurations and an index value associated with the mapping may be used to indicate the silencing signal configuration. In some cases, the serving base station 105-d may determine that subsequent downlink communications to the UE 115-d are to include periodic gaps based on the silencing signal configuration that allow for the UE 115-d to transmit instances of the silencing signal.

At 530, the serving base station 105-d may transmit silencing signal configuration information to the UE 115-d. In some cases, the silencing signal configuration information may be transmitted in a MAC-CE, in DCI, or in RRC signaling to the UE 115-d. In some cases, the silencing signal configuration information may include all of a subset of silencing signal configuration parameters, such as a starting slot of the silencing signal, a starting symbol of the silencing signal, a periodicity for transmitting instances of the silencing signal, an end symbol of the silencing signal, or any combinations thereof. In some cases, the silencing signal configuration information may include an index value that is mapped to a configured silencing signal configuration (e.g., a specified mapping, a set of available silencing signal configurations provided by RRC, and the like). In some cases, the silencing signal configuration information may include an indication to start transmissions of silencing signals during downlink communications to the UE 115-d. In some cases, the interfering node indication may signal that the interfering node is no longer active, and the silencing signal configuration may indicate to discontinue transmissions of silencing signals.

Optionally, at 535, the serving base station 105-d may transmit an indication of the silencing signal configuration to the interfering base station 105-e. The indication provided to the interfering base station 105-e may provide silencing signal configuration information such as provided to the UE 115-d, for example. At 540, the UE 115-d may configure the silencing signal transmissions based on the silencing signal configuration information received from the serving base station 105-d.

Optionally, at 545, the UE 115-d may identify complaint channel resources of the interfering base station 105-e. In some cases, the complaint channel resources may be a configured RACH resource that is available for victim UEs to indicate to the interfering base station 105-e that transmissions of the interfering base station 105-e are causing interference at the victim UEs. In some cases, the complaint channel resources may include one or more RACH occasions for indication of interference, one or more RACH preambles that may be used to indicate interference, or combinations thereof. In some cases, RACH occasions associated with an SSB may be provided for complaint channel indications, which may indicate a particular beam associated with an SSB is presenting interference at the victim UE(s). In some cases, a particular RACH preamble may be mapped to a silencing signal configuration of a set to available silencing signal configurations.

At 555, the interfering base station may determine a silencing signal configuration. The silencing signal configuration may be determined based on an indication from the serving base station 105-d, from the UE 115-d, or combinations thereof. At 560, the interfering base station 105-e may determine that it is to initiate a transmission, and perform an LBT procedure with wait time based on silencing signal configuration. In the event that the interfering base station 105-e detects an instance of the silencing signal, the LBT may be considered as failed, and the interfering base station 105-e may wait for a period of time (e.g., based on a contention window adjustment following a failed LBT, a wait time associated with the silencing signal configuration, or combinations thereof) and re-try the LBT.

At 565, the serving base station 105-d may transmit a first portion of a downlink communication, which may be received at the UE 115-d. At 570, the UE 115-d may transmit a first instance of the silencing signal. The serving base station 105-d may transmit one or more further portions of the downlink communication, each of which may be followed by an instance of the silencing signal transmitted by the UE 115-d.

Figure 6:
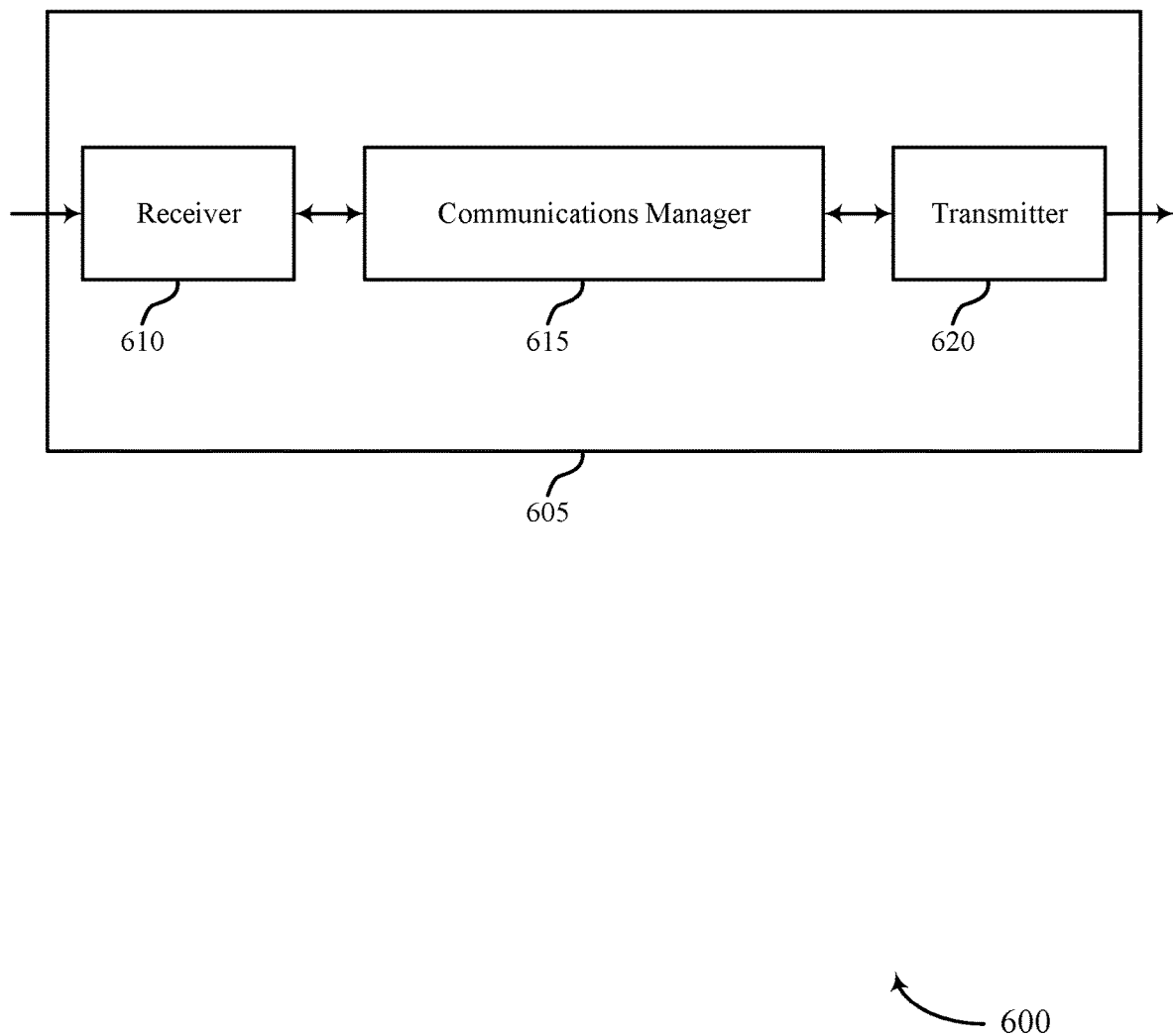
FIGS. 6 and 7 show block diagrams of devices that support interference mitigation through silencing signals in shared radio frequency spectrum in accordance with aspects of the present disclosure.

FIG. 6 shows a block diagram 600 of a device 605 that supports interference mitigation through silencing signals in shared radio frequency spectrum in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to interference mitigation through silencing signals in shared radio frequency spectrum, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may establish a connection with a base station using a shared radio frequency spectrum band, receive, from the base station, configuration information for a silencing signal to be transmitted by the UE, where one or more instances of the silencing signal are multiplexed with downlink communications from the base station to the UE using the shared radio frequency spectrum band, transmit, subsequent to the receiving the first portion of the downlink communications, a first instance of the silencing signal via the shared radio frequency spectrum band based on the configuration information, and receive, from the base station, a first portion of the downlink communications via the shared radio frequency spectrum band. The communications manager 615 may be an example of aspects of the communications manager 910 described herein.

The communications manager 615 may as described herein be implemented to realize one or more potential advantages. One implementation may allow the device 605 to enhance likelihood of successful communications by blocking potential interfering signals from an interfering node, which may allow for enhanced system throughput and reliability, and reduced latency for some communications. Further, implementations may allow the device 605 to have additional flexibility for transmitting silencing signals only in the event that an interfering node is detected, among other advantages.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

In some examples, the communications manager 615 may be implemented as an integrated circuit or chipset for a mobile device modem, and the receiver 610 and transmitter 620 may be implemented as analog components (e.g., amplifiers, filters, antennas) coupled with the mobile device modem to enable wireless transmission and reception over one or more bands.

The communications manager 615 as described herein may be implemented to realize one or more potential advantages. One implementation may allow the device 605 to enhance likelihood of successful communications by blocking potential interfering signals from an interfering node, which may allow for enhanced system throughput and reliability, and reduced latency for some communications. Further, implementations may allow the device 605 to have additional flexibility for transmitting silencing signals in the event that an interfering node is detected, among other advantages.

As such, the device 605 may increase the likelihood of successful communications. In some examples, based on a greater likelihood of successful communications, the device 605 may more efficiently power a processor or one or more processing units associated with an LBT procedure and transmitting and receiving communications, which may enable the device to save power and increase battery life.

Figure 7:
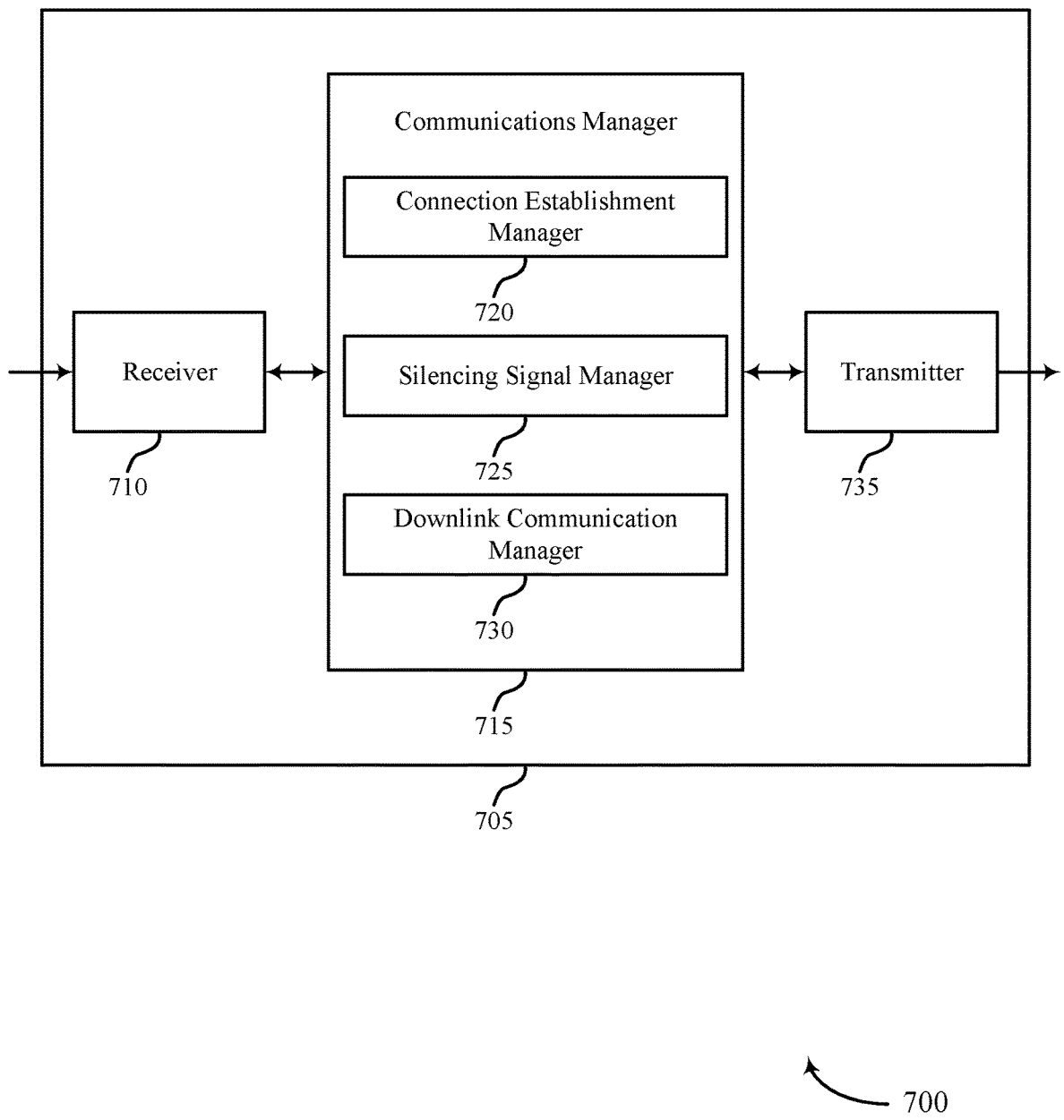

FIG. 7 shows a block diagram 700 of a device 705 that supports interference mitigation through silencing signals in shared radio frequency spectrum in accordance with aspects of the present disclosure. The device 705 may be an example of aspects of a device 605, or a UE 115 as described herein.

The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to interference mitigation through silencing signals in shared radio frequency spectrum, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a connection establishment manager 720, a silencing signal manager 725, and a downlink communication manager 730. The communications manager 715 may be an example of aspects of the communications manager 910 described herein.

The connection establishment manager 720 may establish a connection with a base station using a shared radio frequency spectrum band.

The silencing signal manager 725 may receive, from the base station, configuration information for a silencing signal to be transmitted by the UE, where one or more instances of the silencing signal are multiplexed with downlink communications from the base station to the UE using the shared radio frequency spectrum band and transmit, subsequent to the receiving the first portion of the downlink communications, a first instance of the silencing signal via the shared radio frequency spectrum band based on the configuration information.

The downlink communication manager 730 may receive, from the base station, a first portion of the downlink communications via the shared radio frequency spectrum band.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
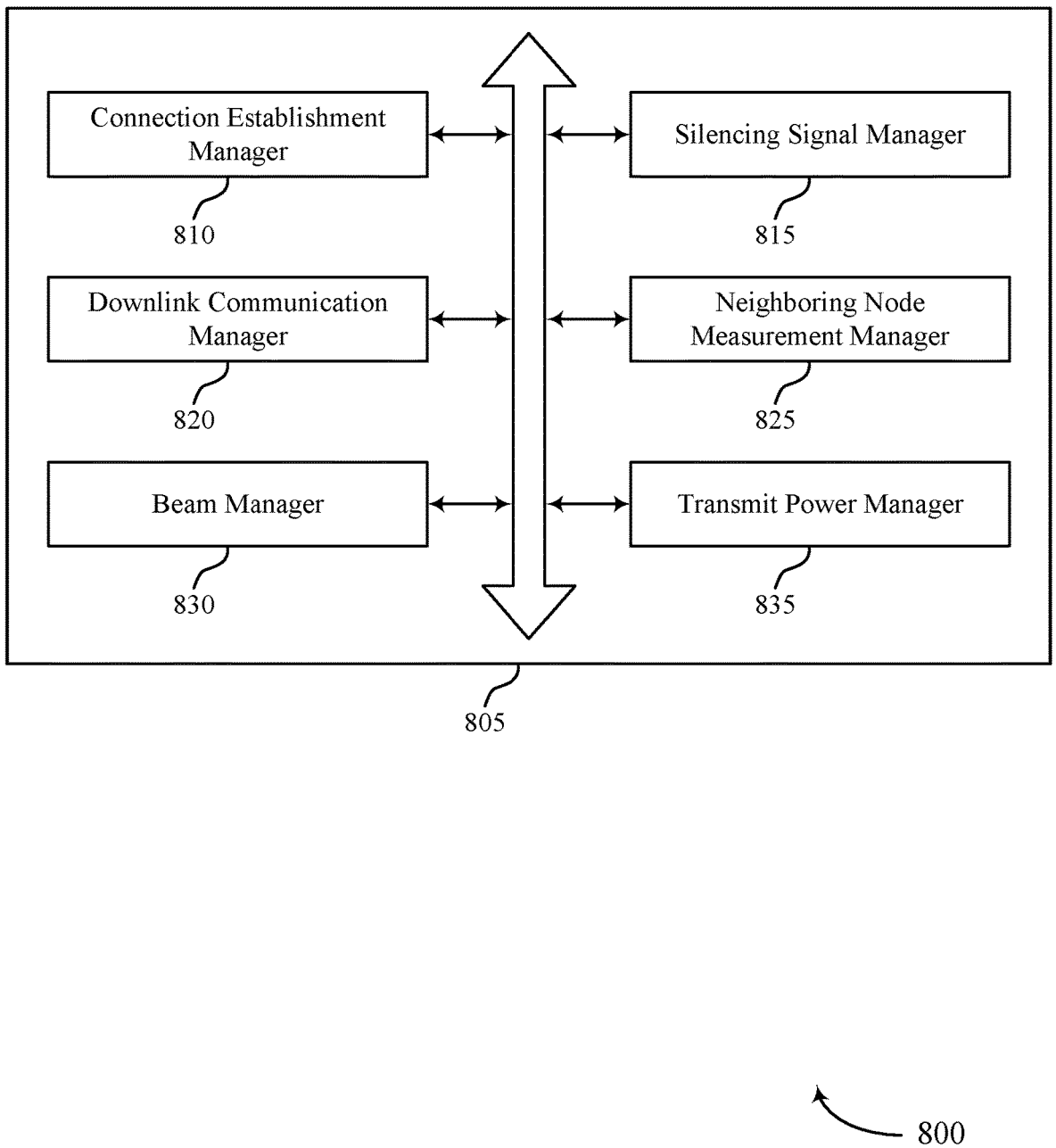
FIG. 8 shows a block diagram of a communications manager that supports interference mitigation through silencing signals in shared radio frequency spectrum in accordance with aspects of the present disclosure.

FIG. 8 shows a block diagram 800 of a communications manager 805 that supports interference mitigation through silencing signals in shared radio frequency spectrum in accordance with aspects of the present disclosure. The communications manager 805 may be an example of aspects of a communications manager 615, a communications manager 715, or a communications manager 910 described herein. The communications manager 805 may include a connection establishment manager 810, a silencing signal manager 815, a downlink communication manager 820, a neighboring node measurement manager 825, a beam manager 830, and a transmit power manager 835. Each of these modules may communicate, directly or indirectly, with one another (e.g., via one or more buses).

The connection establishment manager 810 may establish a connection with a base station using a shared radio frequency spectrum band.

The silencing signal manager 815 may receive, from the base station, configuration information for a silencing signal to be transmitted by the UE, where one or more instances of the silencing signal are multiplexed with downlink communications from the base station to the UE using the shared radio frequency spectrum band. In some examples, the silencing signal manager 815 may transmit, subsequent to the receiving the first portion of the downlink communications, a first instance of the silencing signal via the shared radio frequency spectrum band based on the configuration information. In some examples, the silencing signal manager 815 may transmit, subsequent to the receiving the second portion of the downlink communications, a second instance of the silencing signal via the shared radio frequency spectrum band based on the configuration information. In some examples, the silencing signal manager 815 may transmit an indication of the silencing signal to the neighboring node for use in an LBT procedure at the neighboring node.

In some cases, the configuration information indicates that transmissions of the silencing signal are activated for the downlink communication from the base station. In some cases, the configuration information is provided separately for each of two or more beams used for communications between the UE and the base station. In some cases, the configuration information includes an indication to activate transmission of the silencing signal, and where a subsequent reception of configuration information from the base station indicates to deactivate transmission of the silencing signal.

In some cases, the configuration information includes an indication of wireless resources for transmission of the silencing signal. In some cases, the indication of wireless resources includes one or more of a starting slot of the silencing signal, a starting symbol of the silencing signal, a periodicity for transmitting instances of the silencing signal, an end symbol of the silencing signal, or any combinations thereof. In some cases, the configuration information is received in RRC signaling, in an MAC-CE, in a downlink control information communication from the base station, or any combinations thereof.

In some cases, the configuration information includes format information for the silencing signal. In some cases, the format information includes one or more of a transmission bandwidth for the silencing signal, a scrambling identification to be applied to the transmission of the silencing signal, a reference signal to be used as the silencing signal, or any combinations thereof.

The downlink communication manager 820 may receive, from the base station, a first portion of the downlink communications via the shared radio frequency spectrum band. In some examples, the downlink communication manager 820 may receive, from the base station subsequent to the transmitting the first instance of the silencing signal, a second portion of the downlink communications via the shared radio frequency spectrum band.

The neighboring node measurement manager 825 may identify a presence of a neighboring node on the shared radio frequency spectrum band. In some examples, the neighboring node measurement manager 825 may transmit, to the base station, an indication of the interfering node, where the configuration information for the silencing signal is received responsive to the indication of the neighboring node. In some examples, the neighboring node measurement manager 825 may sense energy from the neighboring node that is above an interference threshold of the UE.

The beam manager 830 may determine to transmit the silencing signal when the downlink communications use a beam that is QCL with the first beam. In some cases, the configuration information corresponds to a first beam that is associated with an SSB transmitted by the base station. In some cases, the silencing signal is transmitted on an uplink beam that is QCL with a downlink beam used for the downlink communications. In some cases, the silencing signal is transmitted on an uplink beam that is directed toward an interfering neighboring node. In some cases, the silencing signal is transmitted on an uplink beam having a wider beam angle than a downlink beam used for the downlink communications.

The transmit power manager 835 may determine a transmit power for the silencing signal. In some cases, the silencing signal is transmitted using a same transmit power as used for uplink communications to the base station. In some cases, the silencing signal is transmitted using a transmit power that is offset by a power offset value from an uplink transmit power used for uplink communications to the base station. In some cases, the silencing signal is transmitted using a highest available transmit power of the UE. In some cases, the silencing signal is transmitted using a transmit power that is determined based on a signal strength of interfering signals received from an interfering neighboring node.

Figure 9:
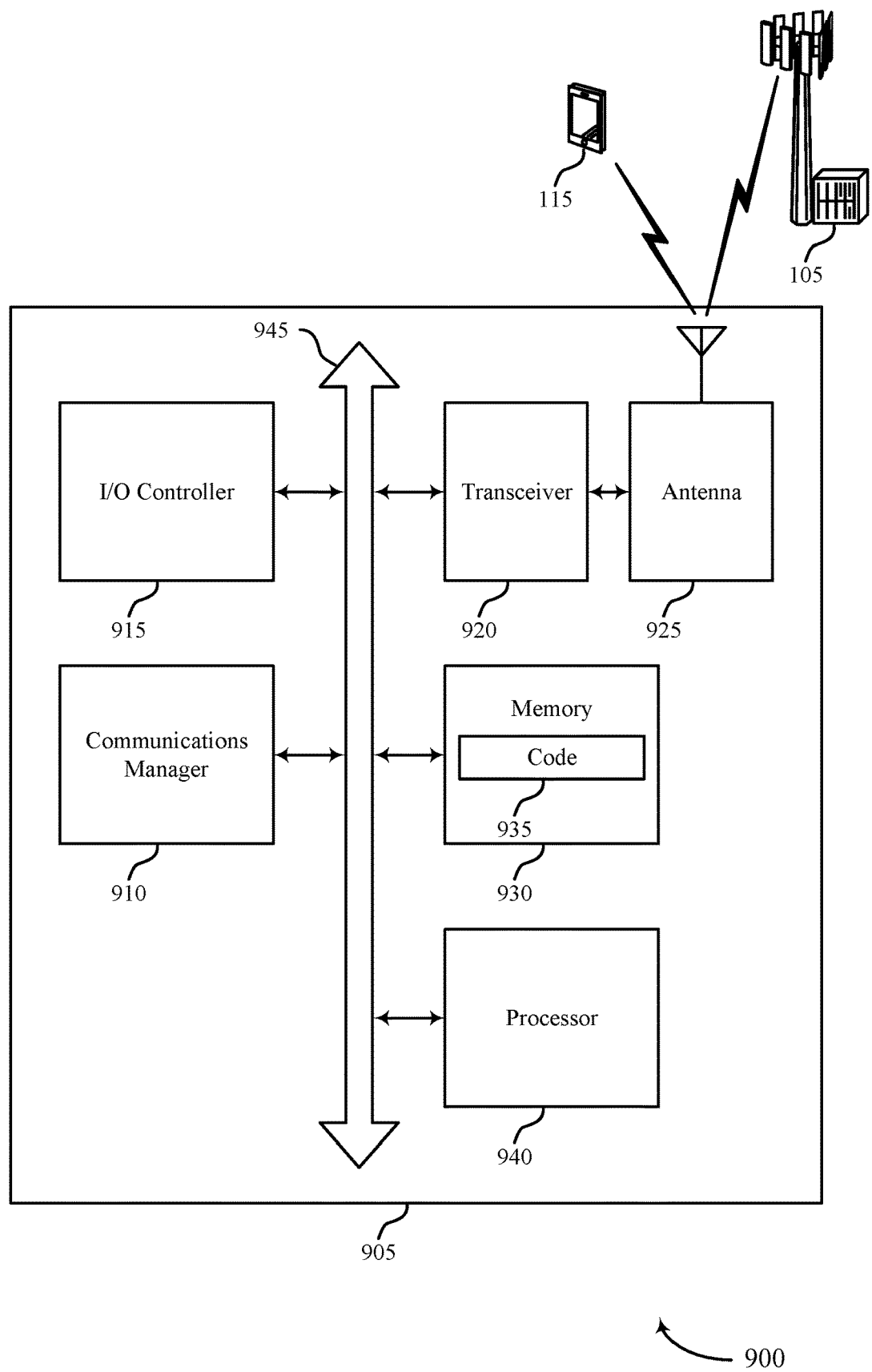
FIG. 9 shows a diagram of a system including a device that supports interference mitigation through silencing signals in shared radio frequency spectrum in accordance with aspects of the present disclosure.

FIG. 9 shows a diagram of a system 900 including a device 905 that supports interference mitigation through silencing signals in shared radio frequency spectrum in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may establish a connection with a base station using a shared radio frequency spectrum band, receive, from the base station, configuration information for a silencing signal to be transmitted by the UE, where one or more instances of the silencing signal are multiplexed with downlink communications from the base station to the UE using the shared radio frequency spectrum band, transmit, subsequent to the receiving the first portion of the downlink communications, a first instance of the silencing signal via the shared radio frequency spectrum band based on the configuration information, and receive, from the base station, a first portion of the downlink communications via the shared radio frequency spectrum band.

The communications manager 910 may as described herein be implemented to realize one or more potential advantages. One implementation may allow the device 905 to enhance likelihood of successful communications by blocking potential interfering signals from an interfering node, which may allow for enhanced system throughput and reliability, and reduced latency for some communications. Further, implementations may allow the device 905 to have additional flexibility for transmitting silencing signals in the event that an interfering node is detected, among other advantages.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting interference mitigation through silencing signals in shared radio frequency spectrum).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
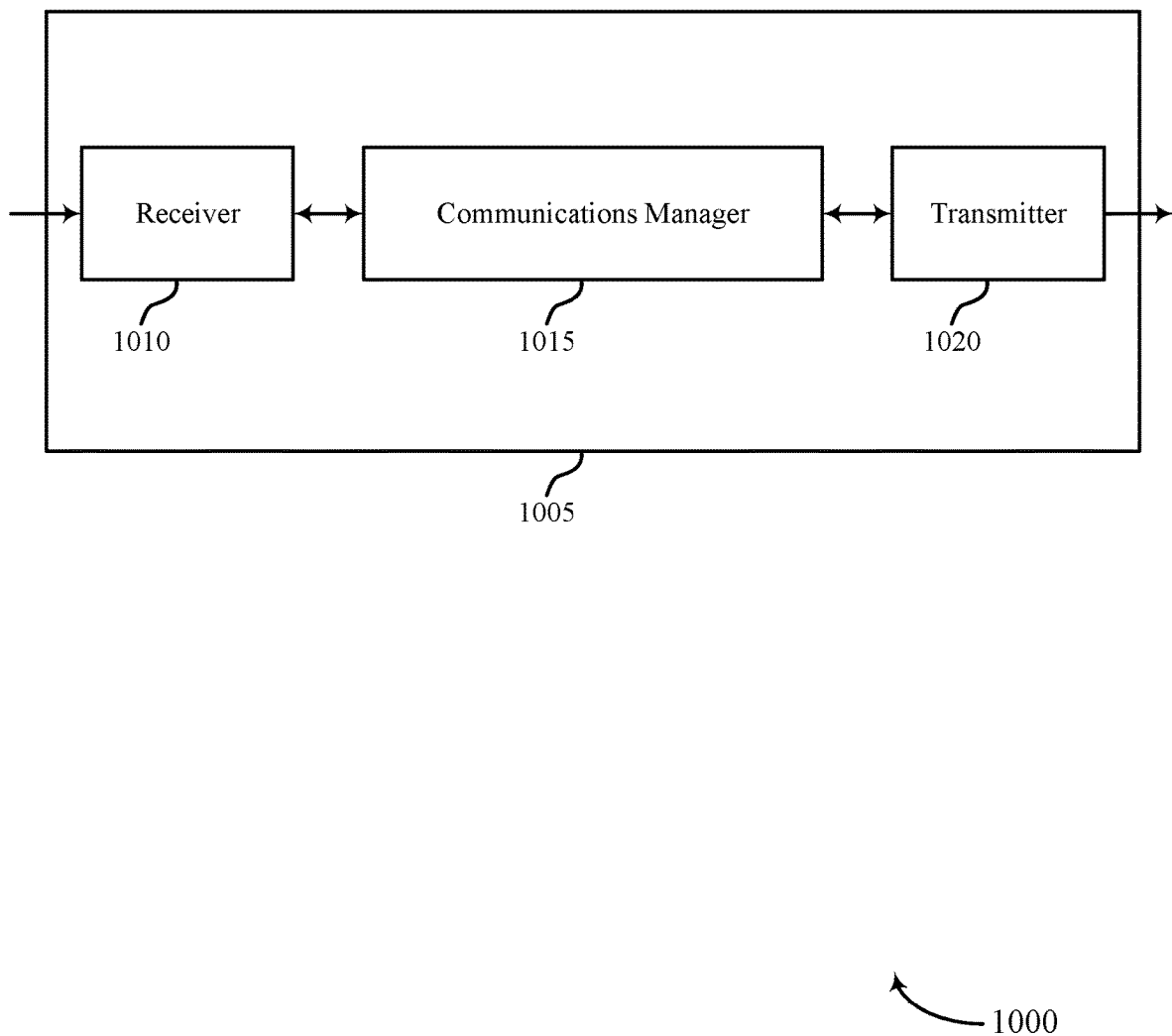
FIGS. 10 and 11 show block diagrams of devices that support interference mitigation through silencing signals in shared radio frequency spectrum in accordance with aspects of the present disclosure.

FIG. 10 shows a block diagram 1000 of a device 1005 that supports interference mitigation through silencing signals in shared radio frequency spectrum in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to interference mitigation through silencing signals in shared radio frequency spectrum, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015, when device 1005 is operating as a serving base station, may establish a connection with a UE using a shared radio frequency spectrum band, transmit, to the UE, configuration information for a silencing signal to be transmitted by the UE, where one or more instances of the silencing signal are multiplexed with downlink communications from the base station to the UE using the shared radio frequency spectrum band, transmit a first portion of the downlink communications to the UE, and transmit, subsequent to a gap following the first portion that is provided for an instance of the silencing signal, a second portion of the downlink communications to the UE.

The communications manager 1015, when device 1005 is operating as a neighboring or interfering node, may receive, from a second wireless node, an indication that a silencing signal is enabled for communications of the second wireless node using a shared radio frequency spectrum band, set a wait time associated with an LBT procedure based on the indication that the silencing signal is enabled, and perform the LBT procedure based on the wait time to determine availability of the shared radio frequency spectrum band for a transmission of the first wireless node. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
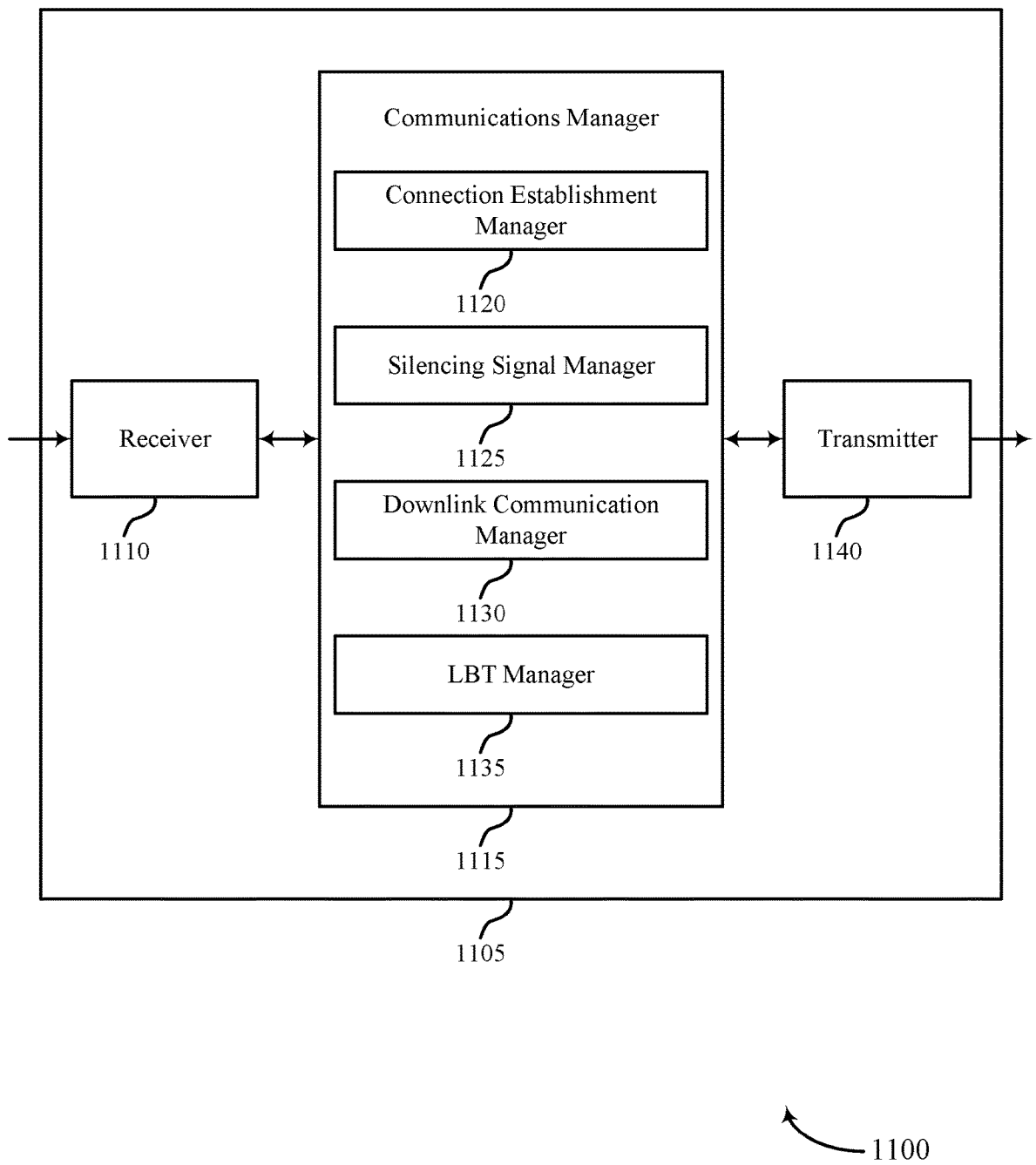

FIG. 11 shows a block diagram 1100 of a device 1105 that supports interference mitigation through silencing signals in shared radio frequency spectrum in accordance with aspects of the present disclosure. The device 1105 may be an example of aspects of a device 1005, or a base station 105 as described herein. The device 1105 may include a receiver 1110, a communications manager 1115, and a transmitter 1140. The device 1105 may also include a processor. Each of these components may be in communication with one another (e.g., via one or more buses).

The receiver 1110 may receive information such as packets, user data, or control information associated with various information channels (e.g., control channels, data channels, and information related to interference mitigation through silencing signals in shared radio frequency spectrum, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a connection establishment manager 1120, a silencing signal manager 1125, a downlink communication manager 1130, and an LBT manager 1135. The communications manager 1115 may be an example of aspects of the communications manager 1310 described herein.

In examples where the device is a serving base station, the connection establishment manager 1120 may establish a connection with a UE using a shared radio frequency spectrum band. The silencing signal manager 1125 may transmit, to the UE, configuration information for a silencing signal to be transmitted by the UE, where one or more instances of the silencing signal are multiplexed with downlink communications from the base station to the UE using the shared radio frequency spectrum band. The downlink communication manager 1130 may transmit a first portion of the downlink communications to the UE and transmit, subsequent to a gap following the first portion that is provided for an instance of the silencing signal, a second portion of the downlink communications to the UE.

In examples where the device is a neighboring or interfering node, the silencing signal manager 1125 may receive, from a second wireless node, an indication that a silencing signal is enabled for communications of the second wireless node using a shared radio frequency spectrum band and set a wait time associated with an LBT procedure based on the indication that the silencing signal is enabled. The LBT manager 1135 may perform the LBT procedure based on the wait time to determine availability of the shared radio frequency spectrum band for a transmission of the first wireless node.

The transmitter 1140 may transmit signals generated by other components of the device 1105. In some examples, the transmitter 1140 may be collocated with a receiver 1110 in a transceiver module. For example, the transmitter 1140 may be an example of aspects of the transceiver 1320 described with reference to FIG. 13. The transmitter 1140 may utilize a single antenna or a set of antennas.

Figure 12:
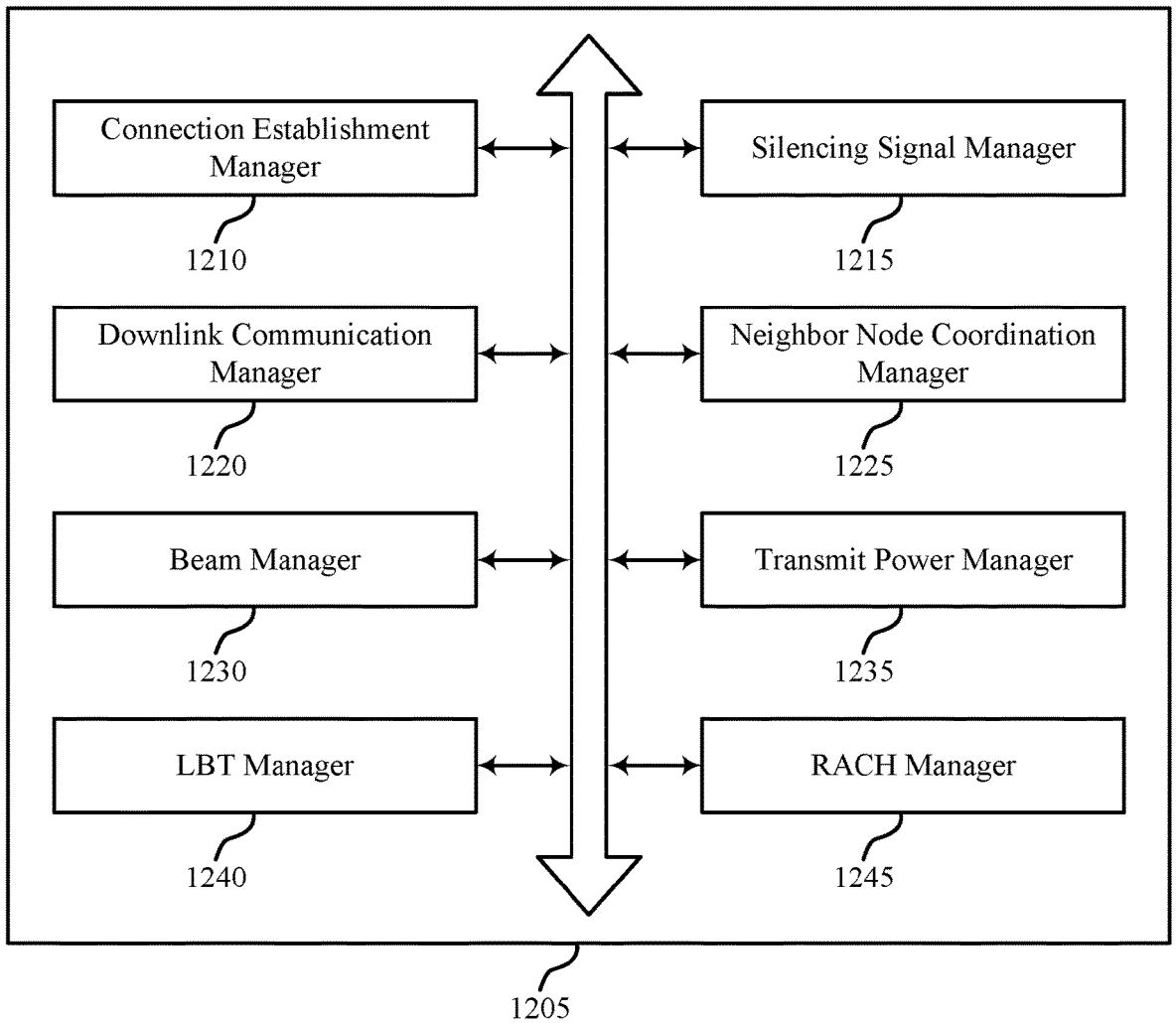
FIG. 12 shows a block diagram of a communications manager that supports interference mitigation through silencing signals in shared radio frequency spectrum in accordance with aspects of the present disclosure.

FIG. 12 shows a block diagram 1200 of a communications manager 1205 that supports interference mitigation through silencing signals in shared radio frequency spectrum in accordance with aspects of the present disclosure. The communications manager 1205 may be an example of aspects of a communications manager 1015, a communications manager 1115, or a communications manager 1310 described herein. The communications manager 1205 may include a connection establishment manager 1210, a silencing signal manager 1215, a downlink communication manager 1220, a neighbor node coordination manager 1225, a beam manager 1230, a transmit power manager 1235, an LBT manager 1240, and a RACH manager 1245. Each of these modules may communicate, directly or indirectly, with one another (e.g., via one or more buses).

In some cases, the device 905 may be a serving base station and the connection establishment manager 1210 may establish a connection with a UE using a shared radio frequency spectrum band. The silencing signal manager 1215 may transmit, to the UE, configuration information for a silencing signal to be transmitted by the UE, where one or more instances of the silencing signal are multiplexed with downlink communications from the base station to the UE using the shared radio frequency spectrum band. In some examples, the silencing signal manager 1215 may receive, from the UE, an indication of a presence of a neighboring node on the shared radio frequency spectrum band, where the configuration information for the silencing signal is transmitted responsive to the indication of the neighboring node. In some examples, the silencing signal manager 1215 may configure the UE with an interference threshold, and where the indication of the presence of the neighboring node indicates that a signal strength of the neighboring node at the UE is above the interference threshold. The downlink communication manager 1220 may transmit a first portion of the downlink communications to the UE. In some examples, the downlink communication manager 1220 may transmit, subsequent to a gap following the first portion that is provided for an instance of the silencing signal, a second portion of the downlink communications to the UE. In some cases, the downlink communications include multiple gaps provided for associated multiple instances of the silencing signal. The neighbor node coordination manager 1225 may transmit an indication of the silencing signal to the neighboring node for use in an LBT procedure at the neighboring node.

In some cases, the configuration information indicates that transmissions of the silencing signal are activated for the downlink communication from the base station. In some cases, the configuration information includes an indication to activate transmission of the silencing signal. In some cases, the configuration information includes an indication of wireless resources for transmission of the silencing signal. In some cases, the indication of wireless resources includes one or more of a starting slot of the silencing signal, a starting symbol of the silencing signal, a periodicity for transmitting instances of the silencing signal, an end symbol of the silencing signal, or any combinations thereof. In some cases, the configuration information is transmitted in RRC signaling, in a MAC-CE, in a downlink control information communication to the UE, or any combinations thereof. In some cases, the configuration information includes format information for the silencing signal. In some cases, the format information includes one or more of a transmission bandwidth for the silencing signal, a scrambling identification to be applied to the transmission of the silencing signal, a reference signal to be used as the silencing signal, or any combinations thereof. In some cases, the transmission from the neighboring base station is a PBCH or an RMSI transmission that indicates a periodicity of the silencing signal, and where the wait time is determined based on the periodicity of the silencing signal.

The beam manager 1230 may determine to transmit the downlink communications with one or more gaps for silencing signals when the downlink communications use a beam that is QCL with the first beam. In some cases, the configuration information is provided separately for each of two or more beams used for communications between the UE and the base station. In some cases, the configuration information corresponds to a first beam that is associated with an SSB transmitted by the base station. In some cases, the silencing signal is configured to be transmitted on an uplink beam that is QCL with a downlink beam used for the downlink communications. In some cases, the silencing signal is configured to be transmitted on an uplink beam that is directed toward an interfering neighboring node. In some cases, the silencing signal is configured to be transmitted on an uplink beam having a wider beam angle than a downlink beam used for the downlink communications.

The transmit power manager 1235 may configure a transmission power for the silencing signal. In some cases, the configuration information indicates to transmit the silencing signal using a same transmit power as used for uplink communications to the base station. In some cases, the configuration information indicates to transmit the silencing signal using a transmit power that is offset by a power offset value from an uplink transmit power used for uplink communications to the base station. In some cases, the configuration information indicates to transmit the silencing signal using a highest available transmit power of the UE. In some cases, the configuration information indicates to transmit the silencing signal using a transmit power that is determined based on a signal strength of interfering signals received from an interfering neighboring node.

In some examples, the device 905 may be a neighboring node and the silencing signal manager 1215 may receive, from a second wireless node, an indication that a silencing signal is enabled for communications of the second wireless node using a shared radio frequency spectrum band. In some examples, the silencing signal manager 1215 may set a wait time associated with an LBT procedure based on the indication that the silencing signal is enabled. The LBT manager 1240 may perform the LBT procedure based on the wait time to determine availability of the shared radio frequency spectrum band for a transmission of the first wireless node. In some cases, the indication that the silencing signal is enabled is received in a transmission from a neighboring base station.

The RACH manager 1245 may configure one or more RACH resources as a complaint channel. In some cases, the indication that the silencing signal is enabled is received in a transmission from a UE. In some cases, the transmission from the UE is received on a complaint channel used for indicating that silencing signals are enabled. In some cases, the complaint channel is a RACH that uses a configured RACH occasion for complaint indications.

Figure 13:
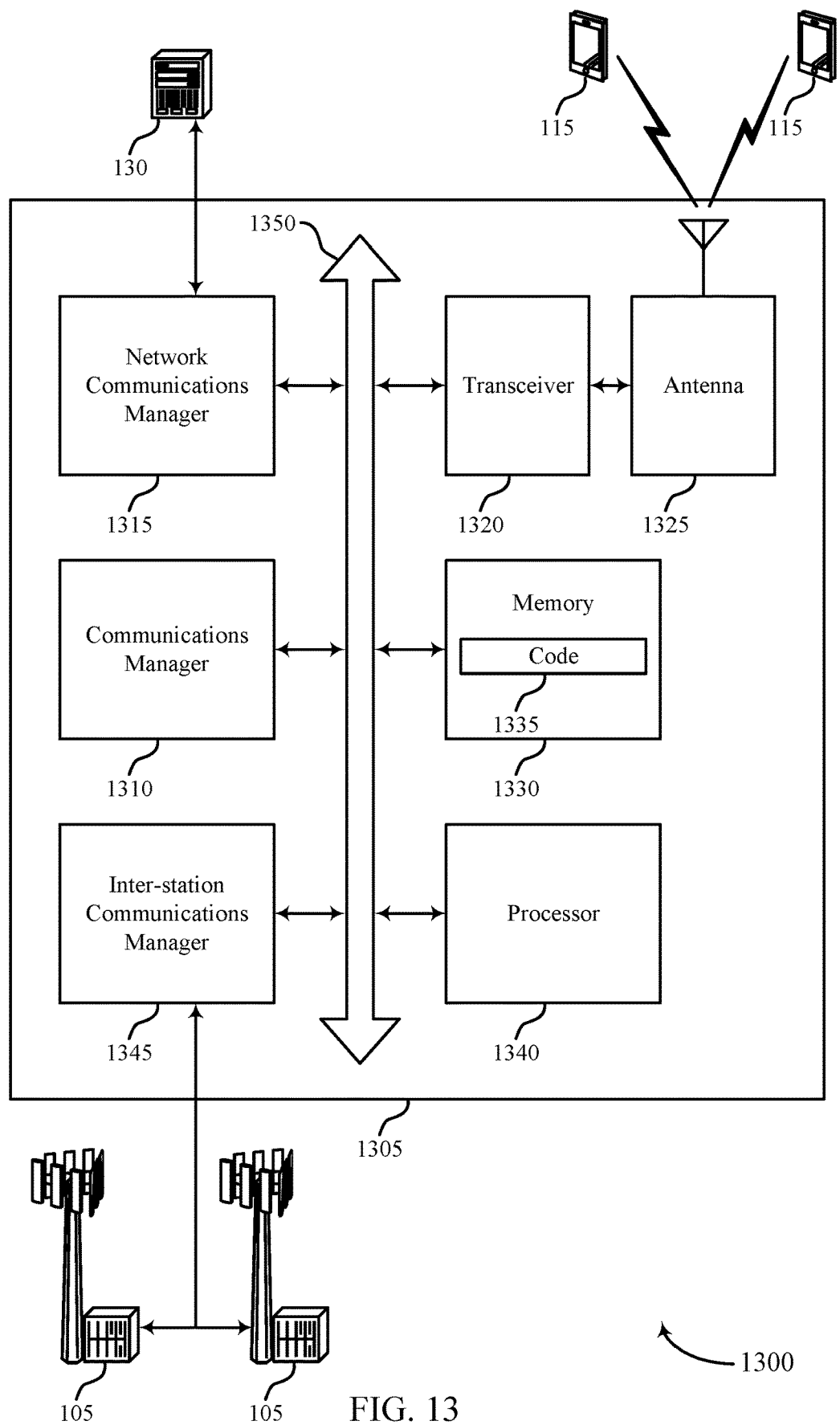
FIG. 13 shows a diagram of a system including a device that supports interference mitigation through silencing signals in shared radio frequency spectrum in accordance with aspects of the present disclosure.

FIG. 13 shows a diagram of a system 1300 including a device 1305 that supports interference mitigation through silencing signals in shared radio frequency spectrum in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

In some case, the communications manager 1310 may establish a connection with a UE using a shared radio frequency spectrum band, transmit, to the UE, configuration information for a silencing signal to be transmitted by the UE, transmit a first portion of a downlink communication to the UE, and transmit, subsequent to a gap following the first portion that is provided for an instance of the silencing signal, a second portion of the downlink communication to the UE.

In some cases, the communications manager 1310 may also receive, from a second wireless node, an indication that a silencing signal is enabled for communications of the second wireless node using a shared radio frequency spectrum band, set a wait time associated with an LBT procedure based on the indication that the silencing signal is enabled, and perform the LBT procedure based on the wait time to determine availability of the shared radio frequency spectrum band for a transmission of the first wireless node.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting interference mitigation through silencing signals in shared radio frequency spectrum).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
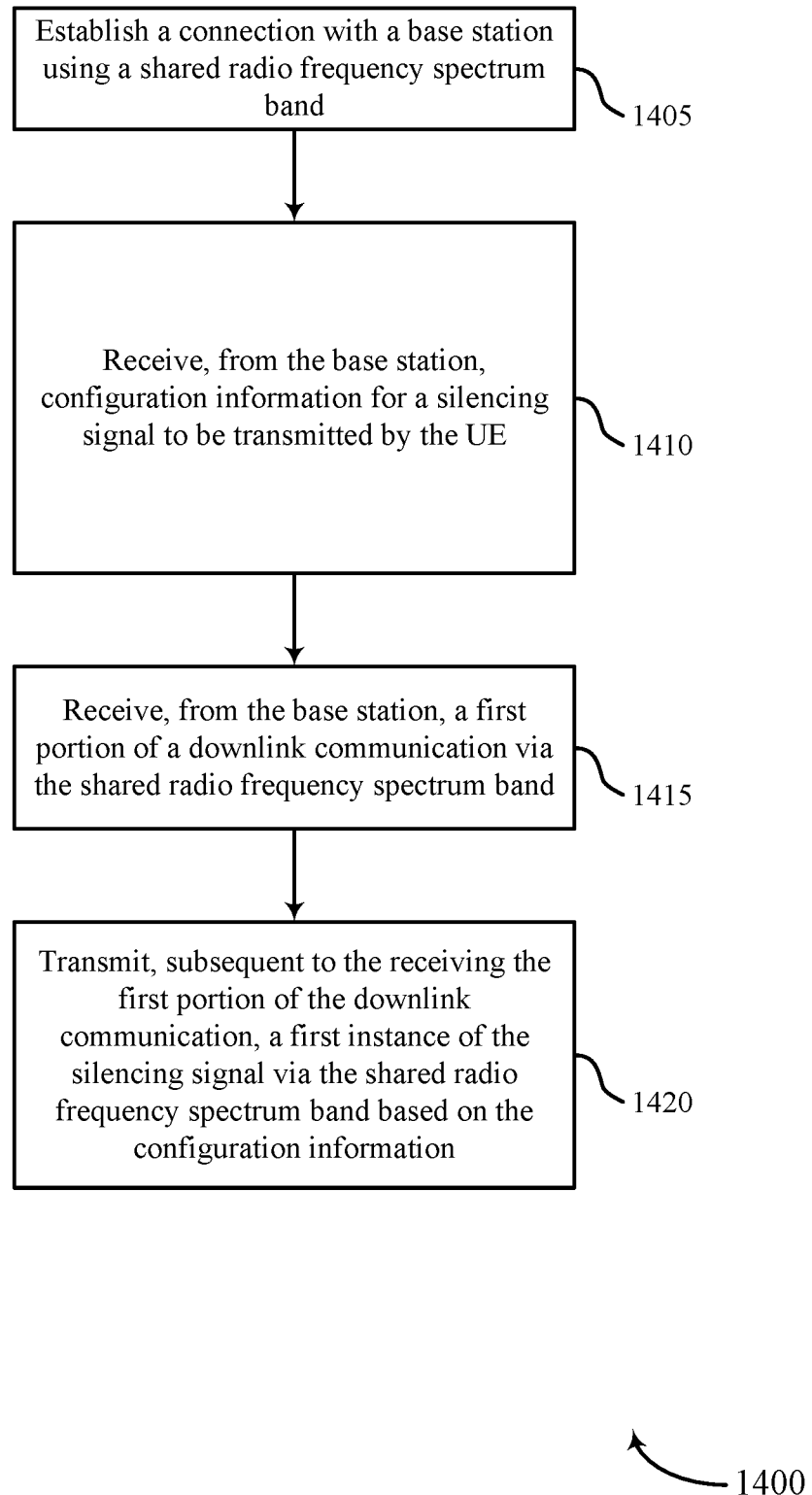
FIGS. 14 through 19 show flowcharts illustrating methods that support interference mitigation through silencing signals in shared radio frequency spectrum in accordance with aspects of the present disclosure.

FIG. 14 shows a flowchart illustrating a method 1400 that supports interference mitigation through silencing signals in shared radio frequency spectrum in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1405, the UE may establish a connection with a base station using a shared radio frequency spectrum band. The operations of 1405 may be performed according to the methods described herein. In some examples, aspects of the operations of 1405 may be performed by a connection establishment manager as described with reference to FIGS. 6 through 9.

At 1410, the UE may receive, from the base station, configuration information for a silencing signal to be transmitted by the UE. In some cases, one or more instances of the silencing signal are multiplexed with downlink communications from the base station to the UE using the shared radio frequency spectrum band. The operations of 1410 may be performed according to the methods described herein. In some examples, aspects of the operations of 1410 may be performed by a silencing signal manager as described with reference to FIGS. 6 through 9.

At 1415, the UE may receive, from the base station, a first portion of a downlink communication via the shared radio frequency spectrum band. The operations of 1415 may be performed according to the methods described herein. In some examples, aspects of the operations of 1415 may be performed by a downlink communication manager as described with reference to FIGS. 6 through 9.

At 1420, the UE may transmit, subsequent to the receiving the first portion of the downlink communication, a first instance of the silencing signal via the shared radio frequency spectrum band based on the configuration information. The operations of 1420 may be performed according to the methods described herein. In some examples, aspects of the operations of 1420 may be performed by a silencing signal manager as described with reference to FIGS. 6 through 9.

Figure 15:
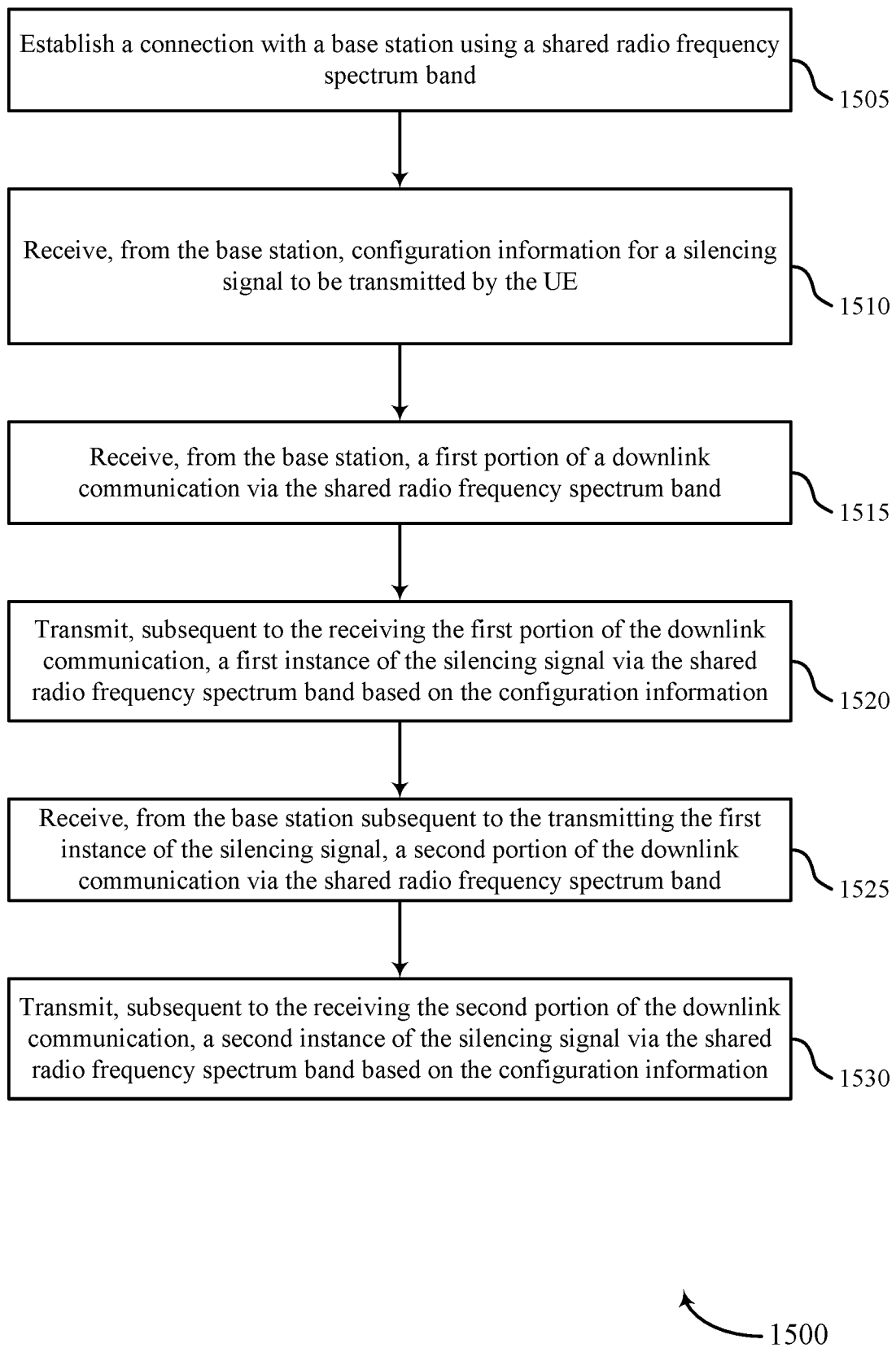

FIG. 15 shows a flowchart illustrating a method 1500 that supports interference mitigation through silencing signals in shared radio frequency spectrum in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1505, the UE may establish a connection with a base station using a shared radio frequency spectrum band. The operations of 1505 may be performed according to the methods described herein. In some examples, aspects of the operations of 1505 may be performed by a connection establishment manager as described with reference to FIGS. 6 through 9.

At 1510, the UE may receive, from the base station, configuration information for a silencing signal to be transmitted by the UE. In some cases, one or more instances of the silencing signal are multiplexed with downlink communications from the base station to the UE using the shared radio frequency spectrum band. The operations of 1510 may be performed according to the methods described herein. In some examples, aspects of the operations of 1510 may be performed by a silencing signal manager as described with reference to FIGS. 6 through 9.

At 1515, the UE may receive, from the base station, a first portion of a downlink communication via the shared radio frequency spectrum band. The operations of 1515 may be performed according to the methods described herein. In some examples, aspects of the operations of 1515 may be performed by a downlink communication manager as described with reference to FIGS. 6 through 9.

At 1520, the UE may transmit, subsequent to the receiving the first portion of the downlink communication, a first instance of the silencing signal via the shared radio frequency spectrum band based on the configuration information. The operations of 1520 may be performed according to the methods described herein. In some examples, aspects of the operations of 1520 may be performed by a silencing signal manager as described with reference to FIGS. 6 through 9.

At 1525, the UE may receive, from the base station subsequent to the transmitting the first instance of the silencing signal, a second portion of the downlink communication via the shared radio frequency spectrum band. The operations of 1525 may be performed according to the methods described herein. In some examples, aspects of the operations of 1525 may be performed by a downlink communication manager as described with reference to FIGS. 6 through 9.

At 1530, the UE may transmit, subsequent to the receiving the second portion of the downlink communication, a second instance of the silencing signal via the shared radio frequency spectrum band based on the configuration information. The operations of 1530 may be performed according to the methods described herein. In some examples, aspects of the operations of 1530 may be performed by a silencing signal manager as described with reference to FIGS. 6 through 9.

Figure 16:
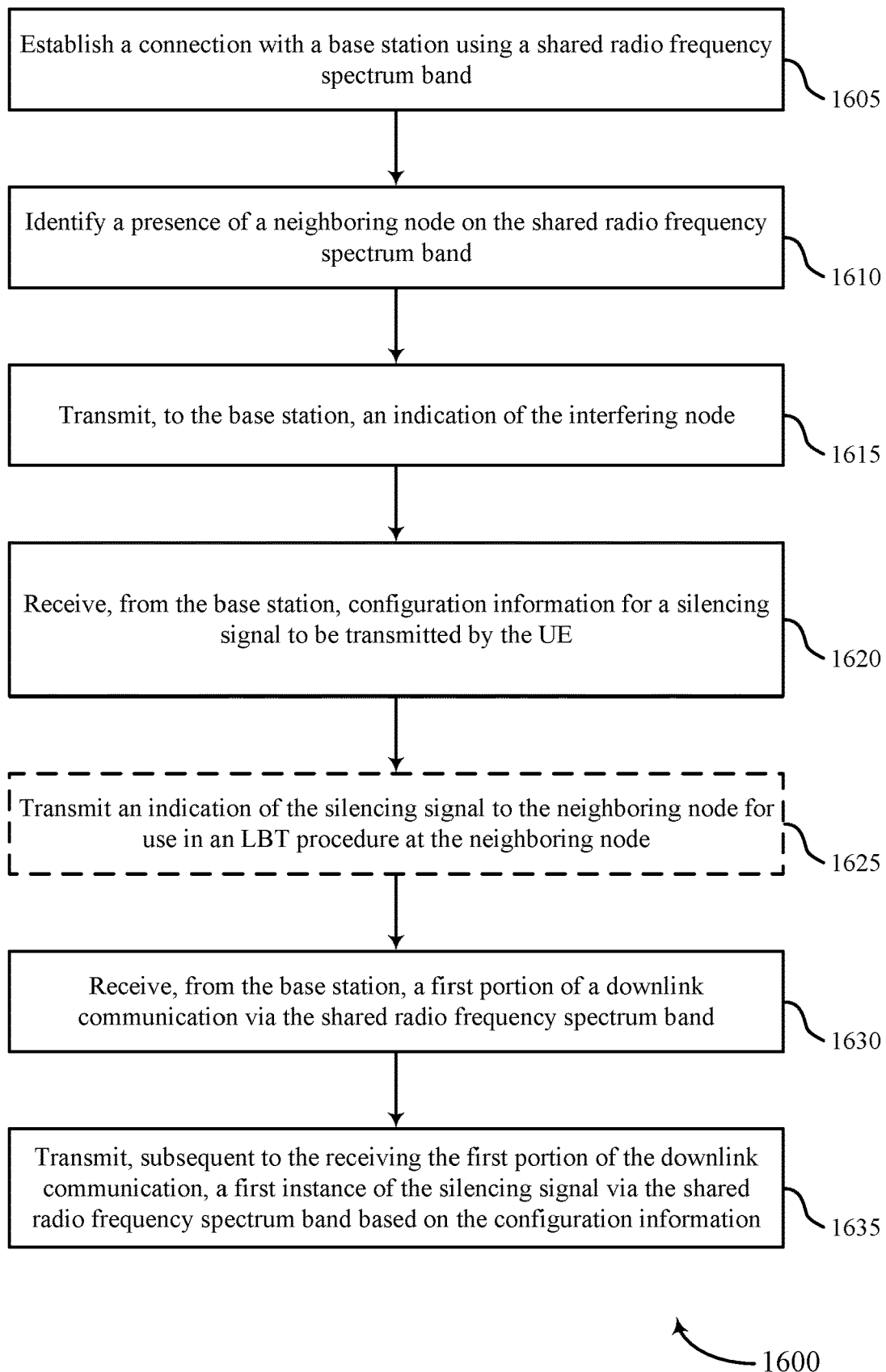

FIG. 16 shows a flowchart illustrating a method 1600 that supports interference mitigation through silencing signals in shared radio frequency spectrum in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1605, the UE may establish a connection with a base station using a shared radio frequency spectrum band. The operations of 1605 may be performed according to the methods described herein. In some examples, aspects of the operations of 1605 may be performed by a connection establishment manager as described with reference to FIGS. 6 through 9.

At 1610, the UE may identify a presence of a neighboring node on the shared radio frequency spectrum band. The operations of 1610 may be performed according to the methods described herein. In some examples, aspects of the operations of 1610 may be performed by a neighboring node measurement manager as described with reference to FIGS. 6 through 9.

At 1615, the UE may transmit, to the base station, an indication of the neighboring node, where the configuration information for the silencing signal is received responsive to the indication of the neighboring node. The operations of 1615 may be performed according to the methods described herein. In some examples, aspects of the operations of 1615 may be performed by a neighboring node measurement manager as described with reference to FIGS. 6 through 9.

At 1620, the UE may receive, from the base station, configuration information for a silencing signal to be transmitted by the UE. In some cases, one or more instances of the silencing signal are multiplexed with downlink communications from the base station to the UE using the shared radio frequency spectrum band. The operations of 1620 may be performed according to the methods described herein. In some examples, aspects of the operations of 1620 may be performed by a silencing signal manager as described with reference to FIGS. 6 through 9.

Optionally, at 1625, the UE may transmit an indication of the silencing signal to the neighboring node for use in an LBT procedure at the neighboring node. The operations of 1625 may be performed according to the methods described herein. In some examples, aspects of the operations of 1625 may be performed by a silencing signal manager as described with reference to FIGS. 6 through 9.

At 1630, the UE may receive, from the base station, a first portion of a downlink communication via the shared radio frequency spectrum band. The operations of 1630 may be performed according to the methods described herein. In some examples, aspects of the operations of 1630 may be performed by a downlink communication manager as described with reference to FIGS. 6 through 9.

At 1635, the UE may transmit, subsequent to the receiving the first portion of the downlink communication, a first instance of the silencing signal via the shared radio frequency spectrum band based on the configuration information. The operations of 1635 may be performed according to the methods described herein. In some examples, aspects of the operations of 1635 may be performed by a silencing signal manager as described with reference to FIGS. 6 through 9.

Figure 17:
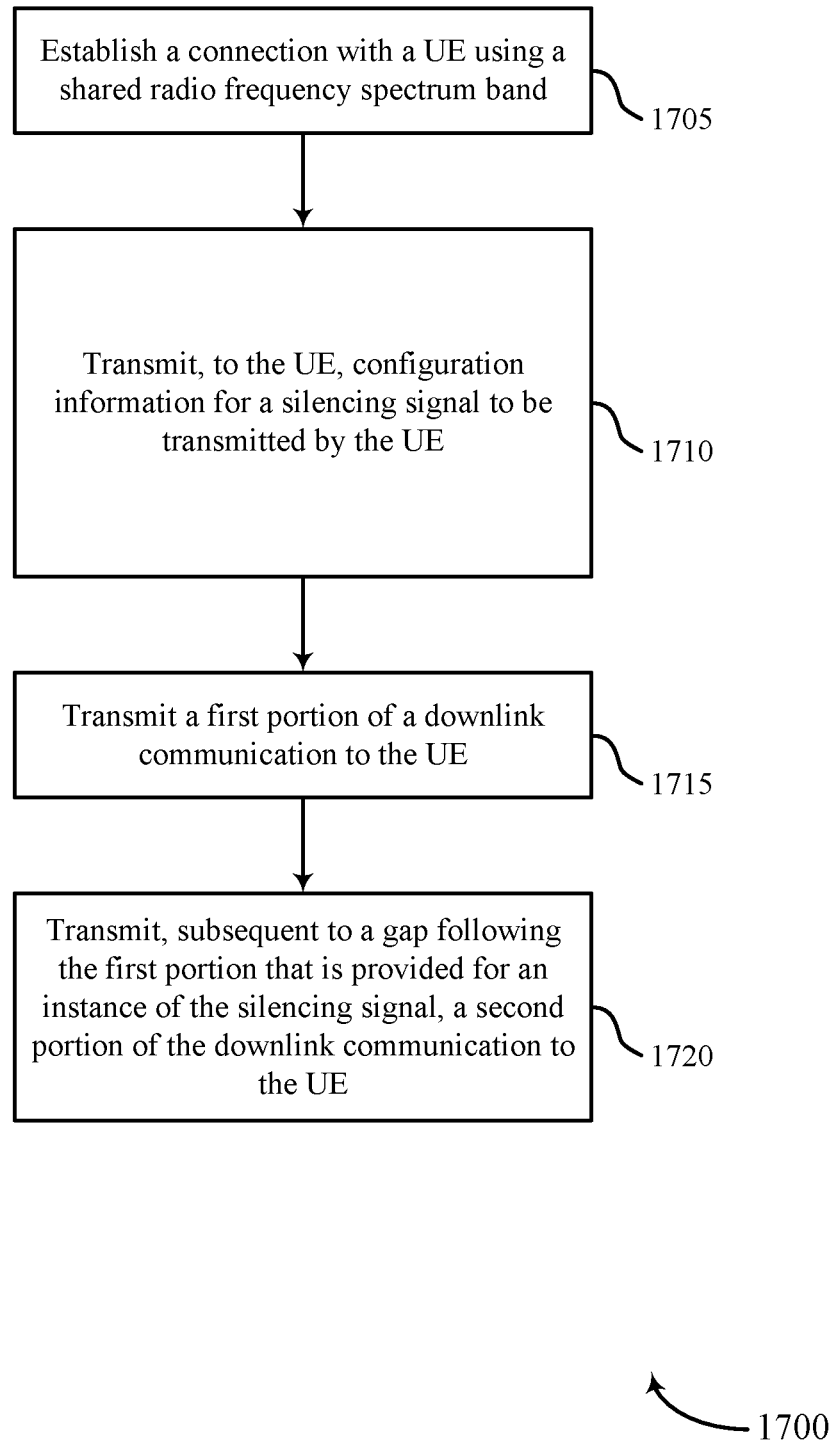

FIG. 17 shows a flowchart illustrating a method 1700 that supports interference mitigation through silencing signals in shared radio frequency spectrum in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1705, the base station may establish a connection with a UE using a shared radio frequency spectrum band. The operations of 1705 may be performed according to the methods described herein. In some examples, aspects of the operations of 1705 may be performed by a connection establishment manager as described with reference to FIGS. 10 through 13.

At 1710, the base station may transmit, to the UE, configuration information for a silencing signal to be transmitted by the UE. In some cases, one or more instances of the silencing signal are multiplexed with downlink communications from the base station to the UE using the shared radio frequency spectrum band. The operations of 1710 may be performed according to the methods described herein. In some examples, aspects of the operations of 1710 may be performed by a silencing signal manager as described with reference to FIGS. 10 through 13.

At 1715, the base station may transmit a first portion of a downlink communication to the UE. The operations of 1715 may be performed according to the methods described herein. In some examples, aspects of the operations of 1715 may be performed by a downlink communication manager as described with reference to FIGS. 10 through 13.

At 1720, the base station may transmit, subsequent to a gap following the first portion that is provided for an instance of the silencing signal, a second portion of the downlink communication to the UE. The operations of 1720 may be performed according to the methods described herein. In some examples, aspects of the operations of 1720 may be performed by a downlink communication manager as described with reference to FIGS. 10 through 13.

Figure 18:
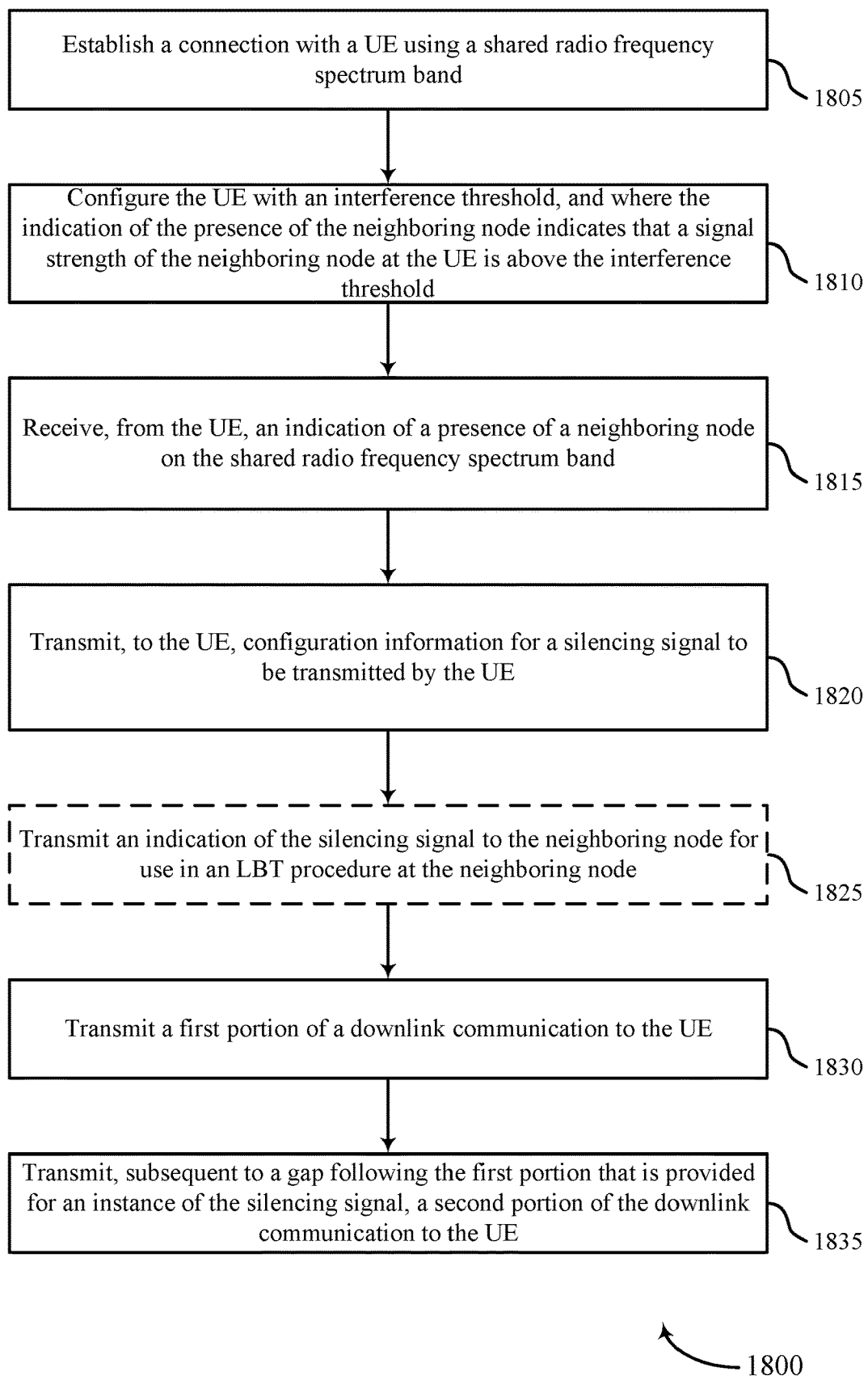

FIG. 18 shows a flowchart illustrating a method 1800 that supports interference mitigation through silencing signals in shared radio frequency spectrum in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1805, the base station may establish a connection with a UE using a shared radio frequency spectrum band. The operations of 1805 may be performed according to the methods described herein. In some examples, aspects of the operations of 1805 may be performed by a connection establishment manager as described with reference to FIGS. 10 through 13.

At 1810, the base station may configure the UE with an interference threshold, and where the indication of the presence of the neighboring node indicates that a signal strength of the neighboring node at the UE is above the interference threshold. The operations of 1810 may be performed according to the methods described herein. In some examples, aspects of the operations of 1810 may be performed by a silencing signal manager as described with reference to FIGS. 10 through 13.

At 1815, the base station may receive, from the UE, an indication of a presence of a neighboring node on the shared radio frequency spectrum band, where the configuration information for the silencing signal is transmitted responsive to the indication of the neighboring node. The operations of 1815 may be performed according to the methods described herein. In some examples, aspects of the operations of 1815 may be performed by a silencing signal manager as described with reference to FIGS. 10 through 13.

At 1820, the base station may transmit, to the UE, configuration information for a silencing signal to be transmitted by the UE. In some cases, one or more instances of the silencing signal are multiplexed with downlink communications from the base station to the UE using the shared radio frequency spectrum band. The operations of 1820 may be performed according to the methods described herein. In some examples, aspects of the operations of 1820 may be performed by a silencing signal manager as described with reference to FIGS. 10 through 13.

Optionally, at 1825, the base station may transmit an indication of the silencing signal to the neighboring node for use in an LBT procedure at the neighboring node. The operations of 1825 may be performed according to the methods described herein. In some examples, aspects of the operations of 1825 may be performed by a neighbor node coordination manager as described with reference to FIGS. 10 through 13.

At 1830, the base station may transmit a first portion of a downlink communication to the UE. The operations of 1830 may be performed according to the methods described herein. In some examples, aspects of the operations of 1830 may be performed by a downlink communication manager as described with reference to FIGS. 10 through 13.

At 1835, the base station may transmit, subsequent to a gap following the first portion that is provided for an instance of the silencing signal, a second portion of the downlink communication to the UE. The operations of 1835 may be performed according to the methods described herein. In some examples, aspects of the operations of 1835 may be performed by a downlink communication manager as described with reference to FIGS. 10 through 13.

Figure 19:
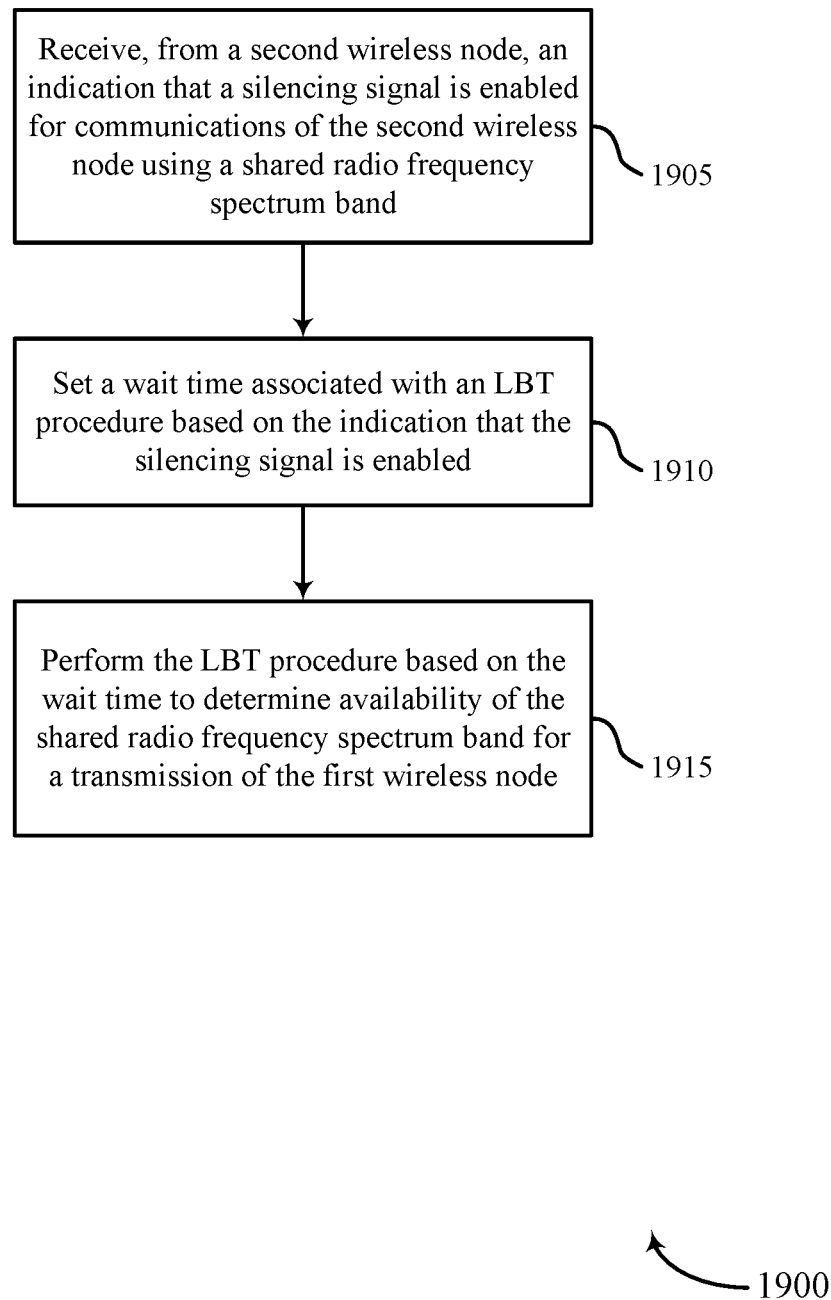

FIG. 19 shows a flowchart illustrating a method 1900 that supports interference mitigation through silencing signals in shared radio frequency spectrum in accordance with aspects of the present disclosure. The operations of method 1900 may be implemented by a base station 105, an interfering or neighboring node, or components thereof, as described herein. For example, the operations of method 1900 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1905, the base station may receive, from a second wireless node, an indication that a silencing signal is enabled for communications of the second wireless node using a shared radio frequency spectrum band. The operations of 1905 may be performed according to the methods described herein. In some examples, aspects of the operations of 1905 may be performed by a silencing signal manager as described with reference to FIGS. 10 through 13.

At 1910, the base station may set a wait time associated with an LBT procedure based on the indication that the silencing signal is enabled. The operations of 1910 may be performed according to the methods described herein. In some examples, aspects of the operations of 1910 may be performed by a silencing signal manager as described with reference to FIGS. 10 through 13.

At 1915, the base station may perform the LBT procedure based on the wait time to determine availability of the shared radio frequency spectrum band for a transmission of the first wireless node. The operations of 1915 may be performed according to the methods described herein. In some examples, aspects of the operations of 1915 may be performed by an LBT manager as described with reference to FIGS. 10 through 13.

The following provides an overview of aspects of the present disclosure:

The following provides an overview of aspects of the present disclosure:

Aspect 1: A method for wireless communication at a UE, comprising: establishing a connection with a base station using a shared radio frequency spectrum band; receiving, from the base station, configuration information for a silencing signal to be transmitted by the UE; receiving, from the base station, a first portion of a downlink communication via the shared radio frequency spectrum band; and transmitting, subsequent to the receiving the first portion of the downlink communication, a first instance of the silencing signal via the shared radio frequency spectrum band based at least in part on the configuration information.

Aspect 2: The method of aspect 1, further comprising: receiving, from the base station subsequent to the transmitting the first instance of the silencing signal, a second portion of the downlink communication via the shared radio frequency spectrum band; and transmitting, subsequent to the receiving the second portion of the downlink communication, a second instance of the silencing signal via the shared radio frequency spectrum band based at least in part on the configuration information.

Aspect 3: The method of any of aspects 1 through 2, further comprising: identifying a presence of a neighboring node on the shared radio frequency spectrum band; and transmitting, to the base station, an indication of the neighboring node, wherein the configuration information for the silencing signal is received responsive to the indication of the neighboring node.

Aspect 4: The method of aspect 3, wherein the identifying the presence of the neighboring node comprises: sensing energy from the neighboring node that is above an interference threshold of the UE.

Aspect 5: The method of any of aspects 3 through 4, wherein the configuration information indicates that transmissions of the silencing signal are activated for the downlink communication from the base station.

Aspect 6: The method of any of aspects 3 through 5, further comprising: transmitting an indication of the silencing signal to the neighboring node for use in a listen before talk (LBT) procedure at the neighboring node.

Aspect 7: The method of any of aspects 1 through 6, wherein the configuration information is provided separately for each of two or more beams used for communications between the UE and the base station.

Aspect 8: The method of any of aspects 1 through 7, wherein the configuration information corresponds to a first beam that is associated with a synchronization signal block (SSB) transmitted by the base station.

Aspect 9: The method of aspect 8, further comprising: determining to transmit the silencing signal when the downlink communication use a beam that is quasi co-located (QCL) with the first beam.

Aspect 10: The method of any of aspects 1 through 9, wherein the configuration information includes an indication to activate transmission of the silencing signal, and a subsequent reception of configuration information from the base station indicates to deactivate transmission of the silencing signal.

Aspect 11: The method of any of aspects 1 through 10, wherein the configuration information includes an indication of wireless resources for transmission of the silencing signal.

Aspect 12: The method of aspect 11, wherein the indication of wireless resources includes one or more of a starting slot of the silencing signal, a starting symbol of the silencing signal, a periodicity for transmitting instances of the silencing signal, an end symbol of the silencing signal, or any combinations thereof.

Aspect 13: The method of any of aspects 1 through 12, wherein the configuration information is received in RRC signaling, in a medium access control (MAC) control element, in a downlink control information communication from the base station, or any combinations thereof.

Aspect 14: A method for wireless communication at a base station, comprising: establishing a connection with a UE using a shared radio frequency spectrum band; transmitting, to the UE, configuration information for a silencing signal to be transmitted by the UE; transmitting a first portion of a downlink communication to the UE; and transmitting, subsequent to a gap following the first portion that is provided for an instance of the silencing signal, a second portion of the downlink communication to the UE.

Aspect 15: The method of aspect 14, wherein the downlink communication includes multiple gaps provided for associated multiple instances of the silencing signal.

Aspect 16: The method of any of aspects 14 through 15, further comprising: receiving, from the UE, an indication of a presence of a neighboring node on the shared radio frequency spectrum band, wherein the configuration information for the silencing signal is transmitted responsive to the indication of the neighboring node.

Aspect 17: The method of aspect 16, further comprising: configuring the UE with an interference threshold, and wherein the indication of the presence of the neighboring node indicates that a signal strength of the neighboring node at the UE is above the interference threshold.

Aspect 18: The method of any of aspects 16 through 17, wherein the configuration information indicates that transmissions of the silencing signal are activated for the downlink communication from the base station.

Aspect 19: The method of any of aspects 16 through 18, further comprising: transmitting an indication of the silencing signal to the neighboring node for use in a listen before talk (LBT) procedure at the neighboring node.

Aspect 20: The method of any of aspects 14 through 19, wherein the configuration information is provided separately for each of two or more beams used for communications between the UE and the base station.

Aspect 21: The method of any of aspects 14 through 20, wherein the configuration information corresponds to a first beam that is associated with a synchronization signal block (SSB) transmitted by the base station.

Aspect 22: The method of aspect 21, further comprising: determining to transmit the downlink communication with one or more gaps for silencing signals when the downlink communication uses a beam that is quasi co-located (QCL) with the first beam.

Aspect 23: The method of any of aspects 14 through 22, wherein the configuration information includes an indication to activate transmission of the silencing signal.

Aspect 24: The method of any of aspects 14 through 23, wherein the configuration information includes an indication of wireless resources for transmission of the silencing signal.

Aspect 25: The method of aspect 24, wherein the indication of wireless resources includes one or more of a starting slot of the silencing signal, a starting symbol of the silencing signal, a periodicity for transmitting instances of the silencing signal, an end symbol of the silencing signal, or any combinations thereof.

Aspect 26: A method for wireless communication at a first wireless node, comprising: receiving, from a second wireless node, an indication that a silencing signal is enabled for communications of the second wireless node using a shared radio frequency spectrum band; setting a wait time associated with a listen before talk procedure based at least in part on the indication that the silencing signal is enabled; and performing the listen before talk procedure based on the wait time to determine availability of the shared radio frequency spectrum band for a transmission of the first wireless node.

Aspect 27: The method of aspect 26, wherein the indication that the silencing signal is enabled is received in a transmission from a neighboring base station.

Aspect 28: The method of aspect 27, wherein the transmission from the neighboring base station is a physical broadcast channel (PBCH) or a remaining minimum system information (RMSI) transmission that indicates a periodicity of the silencing signal, and the wait time is determined based on the periodicity of the silencing signal.

Aspect 29: The method of aspect 28, wherein the indication that the silencing signal is enabled is received in a transmission from a UE.

Aspect 30: An apparatus for wireless communication at a UE, comprising a processor; memory coupled with the processor; and instructions stored in the memory and executable by the processor to cause the apparatus to perform a method of any of aspects 1 through 13.

Aspect 31: An apparatus for wireless communication at a UE, comprising at least one means for performing a method of any of aspects 1 through 13.

Aspect 32: A non-transitory computer-readable medium storing code for wireless communication at a UE, the code comprising instructions executable by a processor to perform a method of any of aspects 1 through 13.

Aspect 33: An apparatus for wireless communication at a base station, comprising a processor; memory coupled with the processor; and instructions stored in the memory and executable by the processor to cause the apparatus to perform a method of any of aspects 14 through 25.

Aspect 34: An apparatus for wireless communication at a base station, comprising at least one means for performing a method of any of aspects 14 through 25.

Aspect 35: A non-transitory computer-readable medium storing code for wireless communication at a base station, the code comprising instructions executable by a processor to perform a method of any of aspects 14 through 25.

Aspect 36: An apparatus for wireless communication at a first wireless node, comprising a processor; memory coupled with the processor; and instructions stored in the memory and executable by the processor to cause the apparatus to perform a method of any of aspects 26 through 29.

Aspect 37: An apparatus for wireless communication at a first wireless node, comprising at least one means for performing a method of any of aspects 26 through 29.

Aspect 38: A non-transitory computer-readable medium storing code for wireless communication at a first wireless node, the code comprising instructions executable by a processor to perform a method of any of aspects 26 through 29.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   transmitting, to a network device, an indication of a detected presence of an interfering neighboring node, the indication based at least in part on a measurement of the interfering neighboring node;

receiving, from the network device, configuration information for a silencing signal associated with the UE, wherein the configuration information is based at least in part on the indication;

receiving, from the network device, a first portion of a downlink communication via a shared radio frequency spectrum band;

transmitting, subsequent to receiving the first portion of the downlink communication, a first instance of the silencing signal via the shared radio frequency spectrum band based at least in part on the configuration information and the indication of the detected presence of the interfering neighboring node; and receiving, subsequent to transmitting the first instance of the silencing signal, one or more remaining portions of the downlink communication via the shared radio frequency spectrum band.

2. The method of claim 1, further comprising:

receiving, from the network device subsequent to transmitting the first instance of the silencing signal, a second portion of the downlink communication via the shared radio frequency spectrum band; and transmitting, subsequent to receiving the second portion of the downlink communication, a second instance of the silencing signal via the shared radio frequency spectrum band based at least in part on the configuration information and the indication of the detected presence of the interfering neighboring node.

3. The method of claim 1, further comprising:

detecting the presence of the interfering neighboring node on the shared radio frequency spectrum band based at least in part on the measurement of the interfering neighboring node; and transmitting, to the network device, the indication of the detected presence of the interfering neighboring node based at least in part on the detecting, wherein the configuration information for the silencing signal is received responsive to the indication of the detected presence of the interfering neighboring node.

4. The method of claim 3, wherein detecting the presence of the interfering neighboring node comprises:

sensing energy from the detected interfering neighboring node that is above an interference threshold.

5. The method of claim 3, wherein the configuration information indicates that transmissions of the silencing signal are activated for the downlink communication from the network device.

6. The method of claim 3, further comprising:

transmitting an indication of the silencing signal to the interfering neighboring node based at least in part on the detected presence of the interfering neighboring node.

7. The method of claim 1, wherein the configuration information is received separately for each of two or more beams used for communications between the UE and the network device.

8. The method of claim 1, wherein the configuration information corresponds to a first beam that is associated with a synchronization signal block (SSB).

9. The method of claim 8, further comprising:

determining to transmit the silencing signal if the downlink communication uses a beam that is quasi co-located (QCL) with the first beam.

10. The method of claim 1, wherein the configuration information activates transmission of the silencing signal, and wherein a subsequent reception of configuration information from the network device deactivates transmission of the silencing signal.

11. The method of claim 1, wherein the configuration information indicates wireless resources for transmission of the silencing signal.

12. The method of claim 11, wherein the wireless resources include one or more of a starting slot of the silencing signal, a starting symbol of the silencing signal, a periodicity for transmitting instances of the silencing signal, an end symbol of the silencing signal, or any combinations thereof.

13. The method of claim 1, wherein the configuration information is received in radio resource control (RRC) signaling, in a medium access control (MAC) control element, in a downlink control information communication, or any combinations thereof.

14. A method for wireless communication at a network device, comprising:

receiving, from a user equipment (UE), an indication of a detected presence of an interfering neighboring node, the indication based at least in part on a measurement of the interfering neighboring node;

transmitting, to the UE, configuration information for a silencing signal associated with the UE, wherein the configuration information is based at least in part on the indication;

transmitting a first portion of a downlink communication to the UE via a shared radio frequency spectrum band; and transmitting one or more remaining portions of the downlink communication to the UE subsequent to a gap following the first portion, wherein the silencing signal is based at least in part on the configuration information and the indication of the detected presence of the interfering neighboring node.

15. The method of claim 14, wherein the downlink communication includes multiple gaps for multiple instances of the silencing signal.

16. The method of claim 14, further comprising:

receiving, from the UE, the indication of the detected presence of the interfering neighboring node on the shared radio frequency spectrum band, wherein the configuration information for the silencing signal is transmitted responsive to the indication of the detected presence of the interfering neighboring node.

17. The method of claim 16, further comprising:

configuring the UE with an interference threshold, and wherein the indication of the detected presence of the interfering neighboring node indicates that a signal strength of the interfering neighboring node at the UE is above the interference threshold.

18. The method of claim 16, wherein the configuration information indicates that transmissions of the silencing signal are activated for the downlink communication from the network device.

19. The method of claim 16, further comprising:

transmitting an indication of the silencing signal to the interfering neighboring node based at least in part on the indication of the detected presence of the interfering neighboring node.

20. The method of claim 14, wherein the configuration information is transmitted separately for each of two or more beams used for communications between the UE and the network device.

21. The method of claim 14, wherein the configuration information corresponds to a first beam that is associated with a synchronization signal block (SSB) transmitted.

22. The method of claim 21, further comprising:
determining to transmit the downlink communication with one or more gaps for silencing signals if the downlink communication uses a beam that is quasi co-located (QCL) with the first beam.

23. The method of claim 14, wherein the configuration information activates transmission of the silencing signal.

24. The method of claim 14, wherein the configuration information indicates wireless resources for transmission of the silencing signal.

25. The method of claim 24, wherein the wireless resources include one or more of a starting slot of the silencing signal, a starting symbol of the silencing signal, a periodicity for transmitting instances of the silencing signal, an end symbol of the silencing signal, or any combinations thereof.

26. A method for wireless communication at a first wireless node, comprising:
receiving, from a second wireless node, an indication that a silencing signal is enabled for communications associated with the second wireless node using a shared radio frequency spectrum band, wherein the silencing signal is associated with a periodicity and enabled based at least in part on a detected presence of the first wireless node, and wherein the first wireless node is an interfering neighboring node that interferes with the second wireless node;
setting a wait time associated with a listen before talk procedure based at least in part on the indication that the silencing signal is enabled, wherein the wait time is based at least in part on the periodicity; and
performing the listen before talk procedure based at least in part on the wait time to determine availability of the shared radio frequency spectrum band for a transmission of the first wireless node.

27. The method of claim 26, wherein the indication that the silencing signal is enabled is received in a transmission from a neighboring network device.

28. The method of claim 27, wherein the transmission from the neighboring network device is a physical broadcast channel (PBCH) or a remaining minimum system information (RMSI) transmission that indicates a periodicity of the silencing signal, and wherein the wait time is determined based at least in part on the periodicity of the silencing signal.

29. The method of claim 28, wherein the indication that the silencing signal is enabled is received in a transmission from a user equipment (UE).

30. An apparatus for wireless communication at a user equipment (UE), comprising:
a processor,
memory coupled with the processor; and
instructions stored in the memory and executable by the processor to cause the apparatus to:
transmit, to a network device, an indication of a detected presence of an interfering neighboring node, the indication based at least in part on a measurement of the interfering neighboring node;
receive, from the network device, configuration information for a silencing signal associated with the UE, wherein the configuration information is based at least in part on the indication;
receive, from the network device, a first portion of a downlink communication via a shared radio frequency spectrum band;
transmit, subsequent to receiving the first portion of the downlink communication, a first instance of the silencing signal via the shared radio frequency spectrum band based at least in part on the configuration information and the indication of the detected presence of the interfering neighboring node; and
receive, subsequent to transmission of the first instance of the silencing signal, one or more remaining portions of the downlink communication via the shared radio frequency spectrum band.

* * * * *